United States Patent
Andoh

(10) Patent No.: US 9,902,132 B2
(45) Date of Patent: Feb. 27, 2018

(54) METHOD FOR PRODUCING METAL CONTAINING COMPOSITE AND METAL CONTAINING COMPOSITE FORMED BY ADHESION

(71) Applicant: ANDOH—Corporation limited partnership company, Kanagawa (JP)

(72) Inventor: Naoki Andoh, Kanagawa (JP)

(73) Assignee: ANDOH—Corporation limited partnership company, Kanagawa (JP)

( * ) Notice: Subject to any disclaimer, the term of this patent is extended or adjusted under 35 U.S.C. 154(b) by 0 days.

(21) Appl. No.: 15/153,670

(22) Filed: May 12, 2016

(65) Prior Publication Data

US 2016/0333227 A1    Nov. 17, 2016

(30) Foreign Application Priority Data

May 12, 2015  (JP) .................................. 2015-097750

(51) Int. Cl.

| | | |
|---|---|---|
| C09J 7/02 | (2006.01) | |
| B32B 7/12 | (2006.01) | |
| C09J 5/06 | (2006.01) | |
| C09J 163/00 | (2006.01) | |
| B29C 65/00 | (2006.01) | |

(52) U.S. Cl.
CPC ................ B32B 7/12 (2013.01); B29C 65/00 (2013.01); C09J 5/06 (2013.01); C09J 163/00 (2013.01)

(58) Field of Classification Search
CPC ...................................................... C09J 7/0292
See application file for complete search history.

(56) References Cited

U.S. PATENT DOCUMENTS

2010/0098910 A1*  4/2010  Naritomi .................. B32B 7/12
                                                                                    428/141

FOREIGN PATENT DOCUMENTS

| JP | 2010-064397 | 3/2010 |
| JP | 2011-006544 | 1/2011 |
| JP | 2011-026457 | 2/2011 |
| JP | 2011026457 A * | 2/2011 |

(Continued)

OTHER PUBLICATIONS

"Improvement and evaluation of adhesion durability", Joho-kikou Co. Ltd., 1st Edition, Sep. 21, 2012, pp. 372-374.

(Continued)

*Primary Examiner* — Daniel Lee
(74) *Attorney, Agent, or Firm* — JCIPRNET

(57) ABSTRACT

An adhesive (B) of solvent containing adhesive as a suspension of low viscosity is prepared by adding a solvent MIBK to a one-part epoxy adhesive of a dicyandiamide-curable type (A). Metal shaped articles (M1 to M5) as adherends are prepared each of which, through various surface treatment, has specific surface configuration of roughened face and/or ultrafine irregularities and the surface is entirely covered with a thin layer of ceramics such as a metal oxide or metal phosphate. The specified face of each metal shaped article (M1 to M5) is painted with the solvent containing adhesive (B). The faces painted with the adhesive of two metal shaped articles (M1 to M5) are caused to abut each other, the articles are heated to cure the one-epoxy adhesive to accomplish adhesion. With one of the adherends replaced by a CFRP shaped article (P2), a composite of a metal and CFRP can be formed.

2 Claims, 26 Drawing Sheets

Configuration of test piece for measuring shear strength of adhesion

(56) References Cited

FOREIGN PATENT DOCUMENTS

| | | |
|---|---|---|
| JP | 2011-148937 | 8/2011 |
| WO | 2008114669 | 9/2008 |
| WO | 2008126812 | 10/2008 |
| WO | 2008133030 | 11/2008 |
| WO | 2008133096 | 11/2008 |
| WO | 2008133296 | 11/2008 |
| WO | 2008146833 | 12/2008 |
| WO | 2009084648 | 7/2009 |
| WO | 2009116484 | 9/2009 |

OTHER PUBLICATIONS

Katsuhiro Maeda, "Technology Books: Selection of adhesive creating high performance", 7th Edition, Gijutsu-Hyoron-sha Co. Ltd., Mar. 1, 1992, p. 50-51.

* cited by examiner

Sectional schematic view of face of adhesion
(a) Article by NAT treatment (b) Ultrafine concaves of bowl shape (c) V-shaped valley type (d) Step-like shape (e) Special type (shape of mountains on a plain)

(f) Ideal type I
Bar-like convex aggregate type (g) Ideal type II
   Entangled U-shaped vally type (h) Ideal type III
   Random type (i) Ideal type IV
   Standard type (j) Specific copper type (k) Densely growing whisker type (l) Sphere and whisker type

**Configuration of test piece
for measuring shear strength of adhesion**

**Configuration of test piece
for measuring tensile strength of adhesion**

Magnification×100,000

Ti-Alloy

Magnification×1,000

Magnification×10,000

Magnification×100,000

Magnification×1,000

Magnification×10,000

Magnification×100,000

Magnification×1,000

Magnification×10,000

Magnification×10,000

Magnification×100,000

Magnification×1,000

Magnification×10,000

Magnification×100,000

Prepreg face 1 in test piece (Fig.17)

Prepreg face 2 in test piece (Fig.17)

US 9,902,132 B2

METHOD FOR PRODUCING METAL CONTAINING COMPOSITE AND METAL CONTAINING COMPOSITE FORMED BY ADHESION

CROSS REFERENCE TO RELATED APPLICATIONS

This application is based on and claims priority under 35 U.S.C. § 119 to Japanese Patent Application No. 2015-97750, filed on May 12, 2015, the entire content of which is incorporated herein by reference.

TECHNICAL FIELD

The present disclosure relates to a method for producing a metal containing composite and to a metal containing composite formed by adhesion. More particularly, the present disclosure relates to techniques for strongly integrating, by use of an epoxy adhesive, a metal part with another metal part or a metal part with a CFRP (Carbon Fiber Reinforced Plastic) part and provides practical use of a method for integrating a metal part with another metal part or a metal part with a CFRP part in place of an assembling method with bolt and nut, by welding, by tight fitting or the like. The present disclosure deals with all kinds of metal including copper, steel, magnesium alloy, aluminum alloy, titanium alloy or the like and can be applied to general machines, medical instruments, electrical machines, moving machines and other various kinds of machines, and also to manufacturing these machines.

BACKGROUND ART (As to CFRP)

CFRP is called in another more precise manner as CFRTS (Carbon Fiber Reinforced Thermo-Set Plastics) and is ordinarily a shaped article of resin having a matrix resin of thermo-set epoxy resin. While CFRP has been used recently in structures of aircrafts or automobiles, this owes to its mechanical properties of superlight weight and high strength. However, in the passenger aircraft B787 in which newest CFRP is used abundantly, rivet connection as a conventional fixing technique is employed for connecting a wing member of CFRP to another of CFRP and for connecting a CFRP member and an Al-alloy A7075 (extra-super-duralumin) member.

While CFRP contains bundles of carbon fiber (abbreviated as CF conveniently below), cloths of CF or the like abundantly, it is a shaped article of epoxy resin or thermoset plastic. Due to this, bolt and nut connection cannot be used for connecting CFRP with another member of a metal part or the like. Overfastening with a nut may break a CFRP member as a shaped article of resin. Assembling methods were studied for connecting various CRFP members each other regarding passenger aircrafts of the Boeing Company (USA), a manufacturer of aircrafts. After all, a method was employed such that through-holes are formed at the end of each CFRP member, rivets of Ti-alloy, of which the outer diameter is coincident with the through-holes, are pushed into the through-holes, and two members are connected for assembly.

However, it is not an easy matter to perform precision working of two kinds of CFRP members to be connected so that the diameters of the through-holes formed therein are in the level of "rivet diameter +0.1 mm". Further, tremendous number of rivets is necessary for manufacturing an aircraft and the number of working steps required for forming through-holes is beyond supposition. If a metal alloy member can be joined with a CFRP member at the end of it with an adhesive to have high joining strength and reliable adhesiveness, wings or a body structure of an aircraft could be assembled easily by connecting one metal alloy member joined at the end side with another metal alloy member joined at the end side using bolt and nut. Further, if members, in each of which a CFRP part is joined with a metal alloy part, are formed and a metal alloy part of one member can be joined with the CFRP part of another member with high strength of adhesion, an aircraft could be obtained in which all parts are integrated by adhesion via metal alloy.

Here, in conventional techniques, it is clarified that a metal alloy subjected to specific surface treatment (see Patent Documents 1 to 9 by the present inventor for NAT (Nano Adhesion Technology) theory) can be joined with another member with extremely high joining strength of adhesion estimated by shear breaking strength of adhesion as a measurement of adhesive strength. However, while tensile breaking strength varies corresponding to metal species regarding tensile breaking strength (maximum tensile strength) of adhesion, clear reason of adhesion could not be explained yet. Further, theoretical explanation was not established yet as to what a level of maximum shear breaking strength or tensile breaking strength can be obtained using a specific one-part epoxy adhesive, and also as to the theory, that is, from what the strength comes. For this sake, it could not be decided what is to be improved further for making tensile strength of adhesion (maximum tensile strength) have a value near the maximum.

To say this regarding materials for an aircraft, it is necessary to develop a method for obtaining the maximum strength of composites of NAT type (composites obtained by adhesion according to NAT theory) of Al-alloy with Al-alloy, Ti-alloy with Ti-alloy and these with a CFRP member, and also to establish its theoretical explanation. However, there has not been sufficient development of a method or theoretical explanation for this yet. Techniques of accomplishing a light weight structure combining duralumin members, Ti-alloy members, CFRP members, or the like that are of light weight and rigid are important ones in times of energy-saving that will continue yet after now. If reliable adhesion techniques can be attained, it will form a core of such important techniques. Therefore, the above mentioned is important especially for moving machines such as aircrafts, automobiles, or the like.

(As to Current NAT Theory)

Here, summary of the conventional NAT theory established by the inventor will be explained. NAT theory concerns techniques for joining strongly a metal part with another metal member or a metal part with a resin part by use of an adhesive and the following conditions are required as regards metal materials, adhesives and adhesion steps. That is:

(1) The metal material has a roughened surface with convex-concave roughness of 0.8 to 10 µm (Rz) period (roughened surface of micron order period).

(2) Further, there is fine irregularities of 10 to 300 nm period on the above roughened surface.

(3) The surface layer having a surface formed with dual irregularities of the above (1) and (2) consists of at least one hard thin layer of metal oxide, metal phosphate and other ceramics.

(4) A one-part epoxy adhesive is used as an adhesive.

(5) In operation steps of adhesion, there is an operation step of "impregnation" as an operation step for causing the adhesive to penetrate into the bottom of the fine concaves of the irregularities on the surface of the metal member.

While NAT theory is one established by the inventor, it was at first a hypothesis (supposition). However, the inventor practiced the above (1) to (5) for various metal species and confirmed that adhesion strength attained with NAT theory usually exhibits values twice of data without NAT theory. From this, the inventor has come to recognize the hypothesis as a correct theory. Results demonstrating the recognition are disclosed in Patent Document 1 for aluminum alloy, Patent Document 2 for magnesium alloy, Patent Document 3 for stainless steel, Patent Document 4 for copper, Patent Documents 5 and 6 for titanium alloy, Patent Document 7 for general ferrous material, Patent Document 8 for aluminum-plated steel sheet and Patent Document 9 for zinc-plated steel sheet, respectively. Most of these have already been commercialized in the field of electronic machinery, moving machinery or the like, or are in the stage of provisional manufacturing before mass production.

(New NAT Theory)

Adhesive strength of a metal part with another metal part increased twice as before the above NAT theory, thus practical use of it is beginning as mentioned above. Further, it was necessary to change the method of measurement in order to measure the strong adhesion correctly. The inventor adopted a piece comprising two small pieces in which ends of two small pieces of 45 mm×15 mm×3 mm (thickness of 3 mm) are lapped each other and caused to adhere with an adhesive (adhesion area of 0.5 to 0.6 $cm^2$) and used the piece comprising paired small pieces as a specimen for measuring "shear breaking strength of adhesion", instead of the method of measurement by JISK 6849 (ISO 6922) "Method for testing tensile strength of adhesive."

Similarly, as to a specimen for measurement of "tensile strength of adhesion (maximum tensile strength)", small pieces of 18 mm×4 mm×3 mm were used at first, instead of following JIS 6850. The respective edge faces (4 mm×3 mm) of two of the small pieces were caused to confront each other and adhere with an adhesive to form a specimen for measurement, which was then subjected to tensile breaking for measurement of tensile breaking strength of adhesion. However, this specimen exhibited an inferiority such that there is much dispersion in data of measurement because bending moment is apt to be applied on the specimen depending on a manner of fastening, with chucks, the both gripped ends of specimen comprising two joined small pieces with total length of 36 mm when the specimen is to be pulled off in a tensile test. From this, configuration of specimens the inventor uses came to be of a small piece as 50 mm×10 mm×2 mm (the end face of 25 mm×3 mm is for adhesion), and then recently came to be of an elongated small piece as 100 mm×25 mm×3 mm (the end face of 25 mm×3 mm is for adhesion), which is decided to be favorable because dispersion of measured values becomes less.

In short, while NAT theory became spreading, "tensile strength of adhesion", for which measurement is difficult among strengths of adhesion, has been left almost untreated without measuring in contrast to "shear strength of adhesion", for which measurement is easy. Recent circumstances have changed this situation. NAT theory is superior not in adhesion of a metal member and another metal member, but also in adhesion of a metal member and a CFRP member, thus it has come to be remarked in industry of moving machines, especially by firms manufacturing automobiles, aircrafts, or the like. As derived by this, various official committees are inaugurated under the leadership of Ministry of Economics and Industry in Japan and working has begun for proposing new standard methods of ISO regarding methods for measuring strength of adhesion of joined articles with adhesives comprising metal parts, CFRP parts or the like.

As a result, concern of tensile strength of adhesion has become higher and the inventor has come to study improvement of the method for measuring tensile strength of adhesion that are to be submitted to ISO. While studying such, it became clear that what exhibits true strength of adhesion between a metal part and an adhesive is not shear breaking strength of adhesion but tensile breaking strength of adhesion, and that, strictly speaking about the surface configuration of the metal alloy material exhibiting the maximum tensile strength of adhesion, the surface configuration of the metal part according to NAT theory is not necessarily required. The inventor thought this as coming nearer to the essence of joining technology with adhesives and thought of establishing a new theory (New NAT Theory) by summing and arranging these matters. In short, it seemed that the New NAT theory that will be explained later will bring reliability of joining technology with adhesives to each of the above mentioned machine manufacturing industries.

PRIOR TECHNICAL DOCUMENTS

Patent Documents

[Patent Document 1] WO2008/114669
[Patent Document 2] WO2008/133096
[Patent document 3] WO2008/133296
[Patent Document 4] WO2008/126812
[Patent Document 5] WO2008/133030
[Patent Document 6] JP Published Patent Application No. 2010-064397
[Patent Document 7] WO2008/146833
[Patent Document 8] WO2009/084648
[Patent Document 9] WO2009/116484
[Patent Document 10] JP Published Patent Application No. 2011-6544
[Patent Document 11] JP Published Patent Application No. 2011-26457
[Patent Document 12] JP Published Patent Application No. 2011-148937

Non-patent Documents

[Non-patent Document 1] "Improvement and evaluation of adhesion durability", Joho-kikou-sha, $1^{st}$ Edition, 2012, pp. 372-374
[Non-patent Document 2] "Technology Books: Selection of adhesive creating high performance", $7^{th}$ Edition, Katsuhiro Maeda, Gijutsu-Hyoron-sha, 1992, p. 51

SUMMARY

Problem to be Solved by the Disclosure

The inventor carried out plenty of chemical treatment experiments in a trial and error manner, plenty of observations with an electron microscopy, plenty of measurement tests of tensile strength of adhesion, or the like. With these, the inventor confirmed at first that the shear breaking strength of joined pairs of two metal pieces (test pieces) that has been subjected to surface treatment according to NAT theory is 70 to 80 MPa, irrespective of metal species, in the case where a one-part epoxy adhesive, for example, "Scotch Weld EW2040" (made by Three M Japan Co. Ltd.: Main company in Tokyo, Japan) is used, and that the tensile strength of adhesion is 40 to 80 MPa, with variation depending on the metal species. Meanwhile after then, it became apparent that the three conditions of surface treatment of metal materials according to NAT theory is not necessarily required. Changing treatment method for metal materials according to New NAT theory as improved from NAT theory, tensile strength of adhesion of 90 to 100 MPa was confirmed for Ti-alloy and then a treatment method was found that tensile strength of adhesion, having been 80 MPa, increases up to 100 MPa also for Al-alloy.

In short, while "tensile strength of adhesion" that seems to truly show strength of adhesion was not observed with NAT theory, the maximum of tensile strength of adhesion using a one-part epoxy adhesive came to a level of 100 MPa. To say of the present disclosure concretely, it concerns a method for raising tensile strength of adhesion of a piece comprising a pair of metal pieces joined together up to a level of 80 to 100 MPa and discloses its content. Further, the inventor clarified concrete methods for obtaining the extremely high tensile strength of adhesion. The theoretical content is referred to as New NAT theory and it is explained in the specification that New NAT theory is somewhat different from previous NAT theory. It is considered that reliance on New NAT theory brings application of joining technology with adhesives more widely to various machine manufacturing industries.

(Content of New NAT Theory)

It was explained that NAT theory requires the aforementioned five conditions as to surface situation. Meanwhile, it was made clear that the aforementioned "(1) The metal material has a roughened surface with convex-concave roughness of 0.8 to 10 μm (Rz) period (roughened surface of micron order period)" and "(2) There is fine irregularities of 10 to 300 nm period on the above roughened surface" are not necessarily required. Then, taking electron microscopic photographs of other various metal surfaces obtained through various chemical treatments into consideration, in addition to a model of treatment according to NAT theory taking it as a required condition that metal materials have dual irregularities of roughened surface with convex-concave roughness of 0.8 to 10 μm (Rz) period and fine irregularities of 10 to 300 nm period on the roughened surface, a schematic depiction of sectional configuration near the surface of a metal piece having been subjected to chemical treatment was made as explained below.

Then, studying through contrasting this configuration analysis with actual measurement results, it became clear that the above definition of a surface with dual irregularities is not necessarily required to cling onto, though it is not wrong as a concept. Here, FIG. 1(a) to FIG. 1(g) are schematic views showing various sectional configuration of joint faces. FIG. 1(a) is a schematic view showing the concept of basic condition of a surface with dual irregularities required by NAT theory. The sectional configurations shown in FIG. 1(b) to FIG. 1(g) contain ones coincident with the basic condition and also others not coincident. Thus, as can be said from contrasting these configuration views with actual measurement values, though shear strength of adhesion of pieces formed by joining with adhesives does not vary depending on the configuration of various fine irregularities formed on the metal materials, tensile strength of adhesion varies, thus the configuration of various fine irregularities itself being essential element.

At first, while it is supposed that "tensile strength of adhesion" to be observed in Al-alloy is near the maximum, the configuration is not such that has surface roughness of micron order, but such that there are concaves of 20 to 100 nm diameter, the concaves are of a bowl shape and form an orderly aggregate of ultrafine concaves. FIG. 1(g) shows a schematic view of its sectional configuration. The ultrafine concaves of a bowl shape, which are of a "U-shaped valley type", should grip resin (cured adhesive) securely. In short, it is a required condition in operation of adhesion according to NAT theory to carry out operation of "impregnation (penetration deeply into the bottom)". It was considered that if this operation is carried out neatly and securely, adhesive can penetrate into even concaves of 20 nm diameter and then be cured to exhibit a high joining strength, in the case where a one-part epoxy adhesive is used.

This is a basis for presuming that "ultrafine concaves of bowl shape" shown in this schematic view, that is, the sectional view of FIG. 1(b) is one of the most excellent form. It is a pity from such understanding that tensile strength of adhesion was attained merely up to 80 MPa for test pieces of Al-alloys A5052 and A7075 having been subjected to treatment according to NAT. As there were some other test pieces for which tensile strength of adhesion up to 90 MPa was attained, it was clarified that treatment method according to NAT the inventor carried out previously was not the best. Then, the inventor endeavored to come nearer to "ultrafine concaves of bowl shape" shown in the schematic view of FIG. 1(b), further adding trial and error to surface treatment method according to NAT. As a result, a surface treatment method is found and invented with which tensile strength of adhesion of 100 MPa can be attained.

However, such an ideal configuration cannot be obtained with other metals. FIG. 1(c) shows a schematic sectional view of a model of austenite stainless steel such as SUS 304, which has a feature such that roughened surface of micron order forms configuration of "V-shaped valley type". In this case, while shear strength of adhesion is sufficiently high as comparable with the above Al-alloy, tensile strength of adhesion is somewhat lower. This is because that, even though adhesive has penetrated into the bottom of the concaves on the metal material surface and been cured, stress concentration occurs in the upper portion of the V-shaped valley and the area of the upper portion is merely ten and some percent of the joint face. Meanwhile, FIG. 1(d) is a schematic view showing a "step-like shape" of a common steel member represented by SPCC (cold-rolled steel plate). The same metal material that has been subjected to treatment according to NAT has a surface of fine irregularities with a configuration in which the "step" is inclined (the fine irregularities come from pearlite structure).

In this case, tensile strength of adhesion varies depending on the inclination angle of the step profile. While dispersion is apt to occur and seems to be of a level in the mean value higher than stainless steel as a result, there is an inferiority in a simple configuration of step-like irregularities itself. Then, FIG. 1(e) is a schematic view showing sectional form of a model of a kind of pure titanium containing a tiny amount of oxygen subjected to treatment according to NAT and FIG. 8 is an electron microscopic photograph of its surface. The micron order period of roughened surface shown in FIG. 1(e) is somewhat large as 5 to 20 μm and there are cases where the concave-convex period in the surface with fine irregularities amounts to 100 to 500 nm. This concave-convex period in the surface of fine irregularities of 100 to 500 nm is large as compared with one according to the condition of NAT theory. The convex such as protruding from a plain is shaped as a steep mountain and is higher than what was presumed according to NAT theory. While it was a question how this acts on adhesion strength, both "shear strength of adhesion" and "tensile strength of adhesion" were low as a result.

On the other hand, sectional configuration shown in FIG. 1(f) and FIG. 1(h) was derived from the model of the sectional configuration of a first species of pure titanium shown in FIG. 1(e). That is, it was derived supposing that working treatment towards ones having sectional configuration shown in FIG. 1(f) and FIG. 1(h) might be possible through conversion treatment or the like. In short, it corresponds to sectional configuration in which ultrafine irregularities with period of 20 to 100 nm is added to the sectional configuration shown in FIG. 1(e). It was considered that, if materials with a hard surface having such three-dimensional surface configuration with dual irregularities can be formed, it would create the highest tensile strength of adhesion. The electron microscopic photographs of the surface of two kinds of pure titanium pieces obtained through a new surface treatment method with trial and error directed for forming the model are shown as FIG. 9-1 (1,000 times), FIG. 9-2 (10,000 times) and FIG. 9-3 (100,000 times), respectively. The configuration in visage is the very FIG. 1(f) derived supposing to be such. With the piece formed through adhesion of paired pieces according to NAT (test piece) using a one-part epoxy adhesive "EW 2040" (made by Three M Japan Co. Ltd.: Main company in Tobkyo, Japan), tensile strength of adhesion exhibited a level of 80 MPa.

Further, the electron microscopic photographs of the surface of α-β titanium alloy pieces obtained through an analogous treatment method are shown as FIG. 10-1 (1,000 times), FIG. 10-2 (10,000 times) and FIG. 10-3 (100,000 times). The configuration in visage is the very FIG. 1(h). With the piece formed through adhesion of paired pieces according to NAT (test piece) using "EW 2040", tensile strength of adhesion exhibited 90 to 100 MPa. On the other hand, the surface configuration shown in FIG. 1(g) is depicted in a deskwork as expressing a new ideal configuration, considering "bar-like convex aggregate type" shown in FIG. 1(f). Further to say, while FIG. 1(f) shows "bar-like convex aggregate type", an adverse situation is supposed such that concave portions are dominant. From this, a sectional configuration of "entangled U-shaped valley type" was presumed. However, such sectional configuration of materials subjected to surface treatment has not been found yet.

The schematic view of the sectional configuration shown in FIG. 1(i) is one prepared by rewriting the standard configuration of the treated material according to NAT (actually only dimensions are defined) shown in FIG. 1(a) into an arranged form of a schematic view (sectional configuration, etc.). That is, the schematic view of FIG. 1(i) corresponds to one in which ultrafine irregularities of 20 to 100 nm period are formed on a previously formed surface with neat concave bowl-like faces of 1.0 to 5 μm period (Rz). This configuration was depicted taking it as clarified that this configuration is possible for titanium metals. This is viewed in FIG. 11-1 (1,000 times), FIG. 11-2 (10,000 times) and FIG. 11-3 (100,000 times). Here, it is considered that possibility of obtaining this configuration for metal alloys other than titanium alloys is high.

FIG. 12-1 (10,000 times) and FIG. 12-2 (100,000 times) are electron microscopic photographs of surface of copper C1100 subjected to the new treatment method according to this disclosure. FIG. 1(j) is a schematic sectional view depicting the strange surface configuration of this "specific copper type" subjected to treatment according to New NAT. As shown in FIG. 1(j), the surface configuration presents a form in which cubic or rectangular parallelepiped bodies with 10 to 200 nm sides or disc-shaped bodies with about 200 nm diameter stand in a dispersed manner. With the piece formed through adhesion of paired pieces of the material as shown in FIG. 12-1 and FIG. 12-2 treated according to NAT (test piece) using a one-part epoxy adhesive "EW 2040", both shear strength of adhesion and tensile strength of adhesion exhibited a level of 80 MPa. However, it is presumed that tensile strength of adhesion will be attained such as 90 to 100 MPa, if the small protrusions come to exist in further higher density.

FIG. 13-1 (1,000 times), FIG. 13-2 (10,000 times) and FIG. 13-3 (100,000 times), which show strange surface configuration found when studying a treatment according to New NAT for copper C1100, are electron microscopic photographs depicting a situation in which numberless whiskers of copper oxide grow on a shaped article of copper. The sectional configuration shown in FIG. 1(k) is a schematic view of the whiskers of copper oxide. Whiskers, being long, cross among them and are entangled halfway of them. As to the configuration shown in FIG. 13-1 to FIG. 13-3, it is of a question whether adhesive can penetrate fully into the root of the all whiskers even when "impregnation" of adhesive is performed sufficiently.

In short, the question seems to occur because the whiskers are too long. Actually, with the piece formed through adhesion of paired pieces of copper C1100 shown in the electron microscopic photographs using the adhesive "EW 2040", tensile strength of adhesion of 80 MPa cannot be attained, though shear strength of adhesion of 80 is attained. Here, it is presumed that, if the whiskers are shortened without changing the shape of densely growing whiskers to be of the shape of "densely growing whiskers" shown in FIG. 1(k), tensile strength of adhesion of 90 to 100 MPa will be attained. But sorry to say, the inventor has not succeeded yet in forming copper pieces that have such presumed shortened whiskers like a head with close cropped hairs.

The "sphere and whisker type" shown in FIG. 1(l) is a model of the surface of magnesium alloy AZ31B subjected to treatment according to NAT. The "sphere and whisker type" is such a configuration that there is a surface with spherical concave-convex of 1 to 10 μm period, on which further short whiskers seemingly of 50 to 100 nm diameter grow, in other words, short cropped hairs grow on the head. It is apparent, seeing the precedent examples, that also this gives the best configuration.

(New NAT Theory as a Hypothesis Now)

Considering these sectional schematic views in such a manner, the surface configuration, for which "tensile strength of adhesion" is expected to be sufficiently high, is those shown in FIG. 1(b), FIG. 1(f to FIG. 1(l) and this gives a gist of New NAT theory. As another gist, with a surface having such a configuration of fine irregularities and a surface layer of ceramic material such as metal oxide or metal phosphate, tensile strength of adhesion of the piece formed from paired partial pieces by adhesion is comparable with or somewhat higher than shear strength of adhesion. Then, the idea consists in that, if operation of adhesion is carried out in a best mode according to New NAT theory, tensile strength of adhesion and shear strength of adhesion of the pieces formed from paired pieces by adhesion are substantially coincident with those of the cured adhesive that was used respectively. In short, in the case where the best adhesion is performed according to New NAT theory, breaking stress by external force (strength of adhesion) of the pieces formed from paired partial pieces by adhesion is deemed to be equal to the strength of the cured adhesive itself (for tensile strength and shear strength), thus coming near to the simple theory of mechanics of materials.

Here, two matters have not been verified by the New NAT theory. That is, the surface configurations shown in schematic views of FIG. 1(g) and FIG. 1(k) have not been verified yet. Further, in the case where a one-part epoxy adhesive, for example, "Scotch Weld EW2040" (made by Three M Japan Co. Ltd.: Main company in Tokyo, Japan) is used, tensile strength of adhesion of 100 MPa is attained that seemed to be the highest value as tensile strength of adhesion. The inventor formed an adhesive shaped as a dumbbell for measurement of tensile strength by a pouring-molding method such that the "Scotch Weld EW2040" alone is poured into a mold, and then made it cured. After it, the inventor tried to verify that the cured article provides a tensile strength near 100 MPa causing it to be subjected to tensile strength test. But the trial was reduced to a failure. The tensile strength merely comes up to 60 MPa at most, being unable to reduce generation of small voids insides of it to zero. Consequently, it has not been verified that the highest tensile strength of adhesion of a piece formed of partial pieces through adhesion amounts to the tensile strength of a cured adhesive itself.

It is interpreted that this was caused by not using an autoclave, while generation of voids is restrained easily by a method using an autoclave with which treatment is possible raising or reducing pressure. But, it is originally difficult to form a cured adhesive that is formed through shaping an adhesive itself and is absolutely free of void. Although it is also considered that it is possible by injecting the adhesive into a metallic mold coated with TEFRON (polytetrafluoroethylene; trade mark), using an injection molding machine for thermosetting resin, such experiment will probably cause the injection molding machine to be spoiled. In short, verification is not sufficient in this respect. However, construed from data showing that the obtained tensile strength of cured epoxy resin of about 100 MPa is the maximum among those provided by manufacturers of macromolecular chemistry, it is understood that the above interpretation of the inventor is not wrong. The inventor did verify most of the New NAT hypothesis, which provides a method for obtaining an article with high strength formed of pieces comprising a metal or metals by adhesion, as a complete article formed of pieces by adhesion. In such a manner, the present disclosure is expected to provide a new and excellent manufacturing method in the forthcoming industries of general machines, medical instruments, electrical machines, moving machines and other various kinds of machines.

Means for Solving the Problems

The present disclosure adopts the following means for solving the aforementioned problems.

The method for producing a metal containing composite according to a first aspect of the present disclosure comprises:

a step of preparing an adhesive (B) of a solvent containing type formed as a suspension of low viscosity by adding a ketone solvent to a one-part epoxy adhesive of a dicyandiamide-curable type (A) and mixing the same;

a step of preparing metal shaped articles (M1) as adherends, each of which, through various surface treatment, has a surface with ultrafine irregularities covered entirely with substantially ultrafine bowl-shaped concaves of 20 to 100 nm diameter and in which said surface with said ultrafine irregularities is covered with a thin layer of ceramics such as a metal oxide or a metal phosphate;

a step of painting the face for adhesion of each said metal shaped article (M1) with said adhesive (B) of a solvent containing type and volatilizing the ketone solvent in a drying machine or through air-drying; and a step of causing one and another of said metal shaped articles (M1) which were painted with the one-part epoxy adhesive on the face for adhesion to abut on each other and fixing them, heating them at a temperature of 120 to 180° C. and curing the one-part adhesive to accomplish adhesion, wherein the tensile strength of adhesion between the metal shaped articles is equal to or higher than the shear strength of adhesion.

The method for producing a metal containing composite according to a second aspect of the present disclosure comprises:

a step of preparing an adhesive (B) of a solvent containing type formed as a suspension of low viscosity by adding a ketone solvent to a one-part epoxy adhesive of a dicyandiamide-curable type (A) and mixing the same;

a step of preparing metal shaped articles (M2) as adherends, each of which, through various surface treatment, has a roughened surface, in which a forest of convexes shaped like thick walls or shapeless convexes as formed by collapse of such thick walls with long-short diameter of 0.05 to 1 μm and height more than 0.3 μm stand with space 0.1 to 2 μm therebetween, the roughened surface being entirely covered with ultrafine irregularities having period of 20 to 100 nm and the whole surface being covered with a thin layer of ceramics such as a metal oxide or a metal phosphate;

a step of painting the face for adhesion of each said metal shaped article (M2) with said adhesive (B) of a solvent containing type and volatilizing the ketone solvent in a drying machine or through air-drying; and a step of causing one and another of said metal shaped articles (M2) which were painted with the one-part epoxy adhesive on the face for adhesion to abut on each other and fixing them, heating them at a temperature of 120 to 180° C. and curing the one-part adhesive to accomplish adhesion, wherein the tensile strength of adhesion between the metal shaped articles is equal to or higher than the shear strength of adhesion.

The method for producing a metal containing composite according to a third aspect of the present disclosure comprises:

a step of preparing an adhesive (B) of a solvent containing type formed as a suspension of low viscosity by adding a ketone solvent to a one-part epoxy adhesive of a dicyandiamide-curable type (A) and mixing the same;

a step of preparing metal shaped articles (M3) as adherends, each of which, through various surface treatment, has a roughened surface having bowl-like concave faces of 1 to 5 μm period, the roughened surface being entirely covered with ultrafine irregularities having period of 20 to 100 nm and the whole surface being covered with a thin layer of ceramics such as a metal oxide or a metal phosphate;

a step of painting the face for adhesion of each said metal shaped article (M3) with said adhesive (B) of a solvent containing type and volatilizing the ketone solvent in a drying machine or through air-drying; and a step of causing one and another of said metal shaped articles (M3) which were painted with the one-part epoxy adhesive on the face for adhesion to abut on each other and fixing them, heating them at a temperature of 120 to 180° C. and curing the one-part adhesive to accomplish adhesion, wherein the tensile strength of adhesion between the metal shaped articles is equal to or higher than the shear strength of adhesion.

The method for producing a metal containing composite according to a fourth aspect of the present disclosure comprises:

a step of preparing an adhesive (B) of a solvent containing type formed as a suspension of low viscosity by adding a ketone solvent to a one-part epoxy adhesive of a dicyandiamide-curable type (A) and mixing the same;

a step of preparing metal shaped articles (M4) as adherends, each of which, through various surface treatment, has a surface with ultrafine irregularities covered entirely with cubic protrusions in a dimension of 10 to 200 nm or mixed protrusions of such cubic protrusions and disc-shaped protrusions of 100 to 250 nm diameter standing on a plain in a density of 5 to 50 per square of 200 nm side, the whole surface being covered with a thin layer of ceramics such as a metal oxide or a metal phosphate;

a step of painting the face for adhesion of each said metal shaped article (M4) with said adhesive (B) of a solvent containing type and volatilizing the ketone solvent in a drying machine or through air-drying; and a step of causing one and another of said metal shaped articles (M4) which were painted with the one-part epoxy adhesive on the face for adhesion to abut on each other and fixing them with a jig, heating them at a temperature of 120 to 180° C. and curing the one-part adhesive to accomplish adhesion, wherein the tensile strength of adhesion between the metal shaped articles is equal to or higher than the shear strength of adhesion.

The method for producing a metal containing composite according to a fifth aspect of the present disclosure comprises:

a step of preparing an adhesive (B) of a solvent containing type formed as a suspension of low viscosity by adding a ketone solvent to a one-part epoxy adhesive of a dicyandiamide-curable type (A) and mixing the same;

a step of preparing metal shaped articles (M5) as adherends, each of which, through various surface treatment, has a surface configuration loaded with spherical entities of about 100 nm diameter combined among themselves along with a configuration of numerous short whiskers below 10 nm growing on the surface of the spherical entities, the whole surface being covered with a thin layer of ceramics such as a metal oxide or a metal phosphate;

a step of painting the face for adhesion of each said metal shaped article (M5) with said adhesive (B) of a solvent containing type and volatilizing the ketone solvent in a drying machine or through air-drying; and a step of causing one and another of said metal shaped articles (M5) which were painted with the one-part epoxy adhesive on the face for adhesion to abut on each other and fixing them, heating them at a temperature of 120 to 180° C. and curing the one-part adhesive to accomplish adhesion, wherein the tensile strength of adhesion between the metal shaped articles is equal to or higher than the shear strength of adhesion.

The method for producing a metal containing composite according to a sixth aspect of the present disclosure comprises:

a step of preparing an adhesive (B) of a solvent containing type formed as a suspension of low viscosity by adding a ketone solvent to a one-part epoxy adhesive of a dicyandiamide-curable type (A) and mixing the same;

a step of preparing two kinds of metal shaped articles as adherends selected from the following five kinds of metal shaped articles (M1 to M5):

a metal shaped article (M1), which, through various surface treatment, has a surface with ultrafine irregularities covered entirely with substantially ultrafine bowl-shaped concaves of 20 to 100 nm diameter and in which said surface with said ultrafine irregularities is covered with a thin layer of ceramics such as a metal oxide or a metal phosphate, a metal shaped article (M2), which, through various surface treatment, has a roughened surface, in which a forest of convexes shaped like thick walls or shapeless convexes as formed by collapse of such thick walls with long-short diameter of 0.05 to 1 μm and height more than 0.3 μm stand with space 0.1 to 2 μm therebetween, the roughened surface being entirely covered with ultrafine irregularities having period of 20 to 100 nm and the whole surface being covered with a thin layer of ceramics such as a metal oxide or a metal phosphate, a metal shaped article (M3), which, through various surface treatment, has a roughened surface having bowl-like concave faces of 1 to 5 μm period, the roughened surface being entirely covered with ultrafine irregularities having period of 20 to 100 nm and the whole surface being covered with a thin layer of ceramics such as a metal oxide or a metal phosphate, a metal shaped article (M4), which, through various surface treatment, has a surface with ultrafine irregularities covered entirely with cubic protrusions in a dimension of 10 to 200 nm or mixed protrusions of such cubic protrusions and disc-shaped protrusions of 100 to 250 nm diameter standing on a plain in a density of 5 to 50 per square of 200 nm side, the whole surface being covered with a thin layer of ceramics such as a metal oxide or a metal phosphate, and a metal shaped article (M5), which, through various surface treatment, has a surface configuration loaded with spherical entities of about 100 nm diameter combined among themselves along with a configuration of numerous short whiskers below 10 nm growing on the surface of the spherical entities, the whole surface being covered with a thin layer of ceramics such as a metal oxide or a metal phosphate;

a step of painting the face for adhesion of each said selected metal shaped article (M1 to M5) with said adhesive (B) of a solvent containing type and volatilizing the ketone solvent in a drying machine or through air-drying; and a step of causing one and another of said selected metal shaped articles (M1 to M5) which were painted with the one-part epoxy adhesive on the face for adhesion to abut on each other and fixing them, heating them at a temperature of 120 to 180° C. and curing the one-part adhesive to accomplish adhesion, wherein the tensile strength of adhesion between the metal shaped articles is equal to or higher than the shear strength of adhesion.

The method for producing a metal containing composite according to a seventh aspect of the present disclosure comprises:

a step of preparing an adhesive (B) of a solvent containing type formed as a suspension of low viscosity by adding a ketone solvent to a one-part epoxy adhesive of a dicyandiamide-curable type (A) and mixing the same;

a step of preparing one kind of metal shaped article as an adherend selected from the following five kinds of metal shaped articles (M1 to M5):

a metal shaped article (M1), which, through various surface treatment, has a surface with ultrafine irregularities covered entirely with substantially ultrafine bowl-shaped concaves of 20 to 100 nm diameter and in which said surface with said ultrafine irregularities is covered with a thin layer of ceramics such as a metal oxide or a metal phosphate, a metal shaped article (M2), which, through various surface treatment, has a roughened surface, in which a forest of convexes shaped like thick walls or shapeless convexes as formed by collapse of such thick walls with long-short diameter of 0.05 to 1 m and height more than 0.3 µm stand with space 0.1 to 2 µm therebetween, the roughened surface being entirely covered with ultrafine irregularities having period of 20 to 100 nm and the whole surface being covered with a thin layer of ceramics such as a metal oxide or a metal phosphate, a metal shaped article (M3), which, through various surface treatment, has a roughened surface having bowl-like concave faces of 1 to 5 µm period, the roughened surface being entirely covered with ultrafine irregularities having period of 20 to 100 nm and the whole surface being covered with a thin layer of ceramics such as a metal oxide or a metal phosphate, a metal shaped article (M4), which, through various surface treatment, has a surface with ultrafine irregularities covered entirely with cubic protrusions in a dimension of 10 to 200 nm or mixed protrusions of such cubic protrusions and disc-shaped protrusions of 100 to 250 nm diameter standing on a plain in a density of 5 to 50 per square of 200 nm side, the whole surface being covered with a thin layer of ceramics such as a metal oxide or a metal phosphate, and a metal shaped article (M5), which, through various surface treatment, has a surface configuration loaded with spherical entities of about 100 nm diameter combined among themselves along with a configuration of numerous short whiskers below 10 nm growing on the surface of the spherical entities, the whole surface being covered with a thin layer of ceramics such as a metal oxide or a metal phosphate;

a step of painting the face for adhesion of said selected metal shaped article (M1 to M5) with said adhesive (B) of a solvent containing type and volatilizing the ketone solvent in a drying machine or through air-drying;

a step of preparing a resin shaped article (P1) as another adherend by curing a thermosetting epoxy resin composition comprising an epoxy resin as a main constituent;

a step of forming a roughened face for adhesion of the resin shaped article (P1) with several decades µm order on a specified portion of said resin shaped article (P1) by grinding it with physical means, cleaning with water, drying and removing dirt;

a step of painting the roughened face for adhesion of said resin shaped article (P1) with said adhesive (B) of a solvent containing type and volatilizing the ketone solvent in a drying machine or through air-drying;

a step of causing the face for adhesion of said selected metal shaped article (M1 to M5) and the roughened face of adhesion of said resin shaped article (P1), both of which were painted with the one-part epoxy adhesive to abut on each other and fixing the metal shaped article and the resin shaped article, heating the fixed shaped articles at a temperature of 150 to 180° C. and curing the one-part adhesive to accomplish adhesion, wherein the tensile strength of adhesion between the metal shaped article and the resin shaped article is equal to or higher than the shear strength of adhesion.

The method for producing a metal containing composite according to an eighth aspect of the present disclosure comprises:

a step of preparing an adhesive (B) of a solvent containing type formed as a suspension of low viscosity by adding a ketone solvent to a one-part epoxy adhesive of a dicyandiamide-curable type (A) and mixing the same;

a step of preparing one kind of metal shaped article as an adherend selected from the following five kinds of metal shaped articles (M1 to M5):

a metal shaped article (M1), which, through various surface treatment, has a surface with ultrafine irregularities covered entirely with substantially ultrafine bowl-shaped concaves of 20 to 100 nm diameter and in which said surface with said ultrafine irregularities is covered with a thin layer of ceramics such as a metal oxide or a metal phosphate, a metal shaped article (M2), which, through various surface treatment, has a roughened surface, in which a forest of convexes shaped like thick walls or shapeless convexes as formed by collapse of such thick walls with long-short diameter of 0.05 to 1 µm and height more than 0.3 µm stand with space 0.1 to 2 µm therebetween, the roughened surface being entirely covered with ultrafine irregularities having period of 20 to 100 nm and the whole surface being covered with a thin layer of ceramics such as a metal oxide or a metal phosphate, a metal shaped article (M3), which, through various surface treatment, has a roughened surface having bowl-like concave faces of 1 to 5 µm period, the roughened surface being entirely covered with ultrafine irregularities having period of 20 to 100 nm and the whole surface being covered with a thin layer of ceramics such as a metal oxide or a metal phosphate, a metal shaped article (M4), which, through various surface treatment, has a surface with ultrafine irregularities covered entirely with cubic protrusions in a dimension of 10 to 200 nm or mixed protrusions of such cubic protrusions and disc-shaped protrusions of 100 to 250 nm diameter standing on a plain in a density of 5 to 50 per square of 200 nm side, the whole surface being covered with a thin layer of ceramics such as a metal oxide or a metal phosphate, and a metal shaped article (M5), which, through various surface treatment, has a surface configuration loaded with spherical entities of about 100 nm diameter combined among themselves along with a configuration of numerous short whiskers below 10 nm growing on the surface of the spherical entities, the whole surface being covered with a thin layer of ceramics such as a metal oxide or a metal phosphate;

a step of painting the face for adhesion of said selected metal shaped article (M1 to M5) with said adhesive (B) of a solvent containing type and volatilizing the ketone solvent in a drying machine or through air-drying;

a step of preparing a prepreg as a resin shaped article (P2) made of thermosetting epoxy resin composition containing reinforcing fibers as another adherend;

a step of preparing a jig for shaping adapted for containing said prepreg (P2) and said selected one kind of metal shaped article (M1 to M5); and a step of loading said prepreg (P2) and said one kind of metal shaped article (M1 to M5) in said jig, fastening said jig, placing said jig with said prepreg (P2) and metal shaped article (M1 to M5) in a heating container such as an autoclave and curing the entire epoxy resin part with determined operation to accomplish adhesion of the resin shaped article (P2) containing reinforcing fibers that has been cured as a result and the metal shaped article (M1 to M5), wherein the tensile strength of adhesion between the metal shaped article and the resin shaped article is equal to or higher than the shear strength of adhesion.

The method for producing a metal containing composite according to ninth aspect of the present disclosure is characterized in that, in any one of first to eighth aspects, said ketone solvent is methyl-isobutyl-ketone.

The metal containing composite produced according to a tenth aspect of the present disclosure is a metal containing composite produced by the method for producing a metal containing composite according to any one of first to ninth aspects;
wherein said first metal shaped article (M1) is of aluminum, of aluminum alloy or aluminum-plated steel sheet, said second metal shaped article (M2) and said third metal shaped article (M3) are of first to fourth species of pure titanium or titanium alloy, said fourth metal shaped article (M4) is of copper or of copper alloy, and said fifth metal shaped article (M5) is of magnesium alloy.

Advantageous Features of the Disclosure

The present disclosure clarified ideal sectional surface configuration of metal materials for obtaining high shear strength of adhesion and tensile strength of adhesion for the adhesion of pieces comprising a metal or metals with a one-part epoxy adhesive according to New NAT theory, and further clarified the method for forming such surface configuration of a metal. At the same time, the disclosure clarified the maximum tensile strength of adhesion is substantially same as the tensile strength of the one-part epoxy adhesive itself. Consequently, complete adhesion or adhesion for all directions becomes possible with the present disclosure, and also the direction of study is shown here so as to make the strength of adhesion be of the maximum level if obtained strength of adhesion does not come to the level. In short, the present disclosure gives reliability as to what a strength level of adhesion joined with an adhesive can exhibit, whether it is adapted to practical use or not, or the like. As a result, it becomes possible to provide a new manufacturing method in the forthcoming industries of general machines, medical instruments, electrical machines, moving machines and other various kinds of machines.

BRIEF EXPLANATION OF DRAWINGS

FIG. 9-1 to FIG. 9-3 are electron microscopic photographs of second species of pure titanium material "TP340H" (made by Shinnittetsusumikin Co. Ltd. at Tokyo, Japan) treated according to New NAT with magnification of 1,000 times (FIG. 9-1), 10,000 times (FIG. 9-2) and 100,000 times (FIG. 9-3) respectively.

FIG. 10-1 to FIG. 10-3 are electron microscopic photographs of an α-β titanium alloy material "KSTI-9" (made by Kobe-seikousho Co. Ltd. At Kobe. Hyogo Pref., Japan)

treated according to New NAT with magnification of 1,000 times (FIG. 10-1) 10,000 times (FIG. 10-2) and 100,000 times (FIG. 10-3) respectively.

Figure 2:
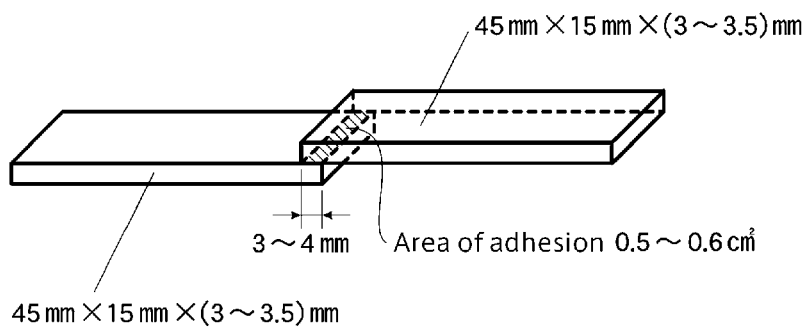
FIG. 2 is a perspective view showing a test piece formed by adhesion of partial pieces, of two metal pieces or of a metal piece and a CFRP piece, with an adhesive for measuring shear strength of adhesion from the breaking force at breaking by pulling out the test piece.
Figure 3:
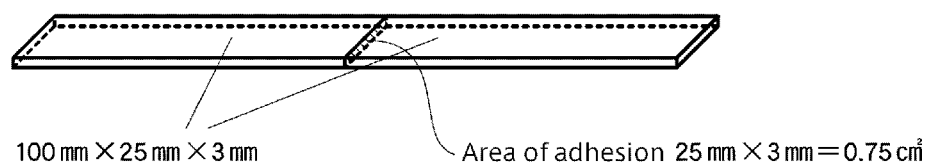
FIG. 3 is a perspective view showing a test piece formed by adhesion of partial pieces, of two metal pieces or of a metal piece and a CFRP piece, with an adhesive for measuring tensile strength of adhesion from the breaking force at breaking by pulling out the test piece.
Figures 1, 9:
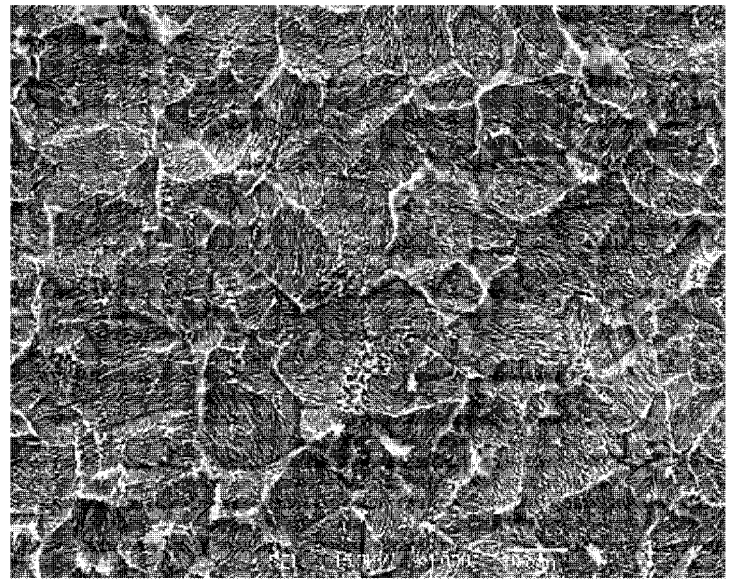
Figures 2, 9:
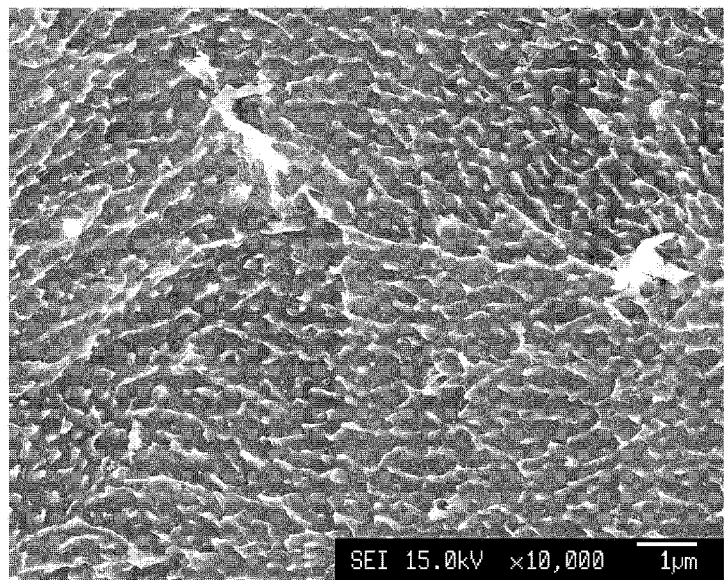
Figures 3, 9:
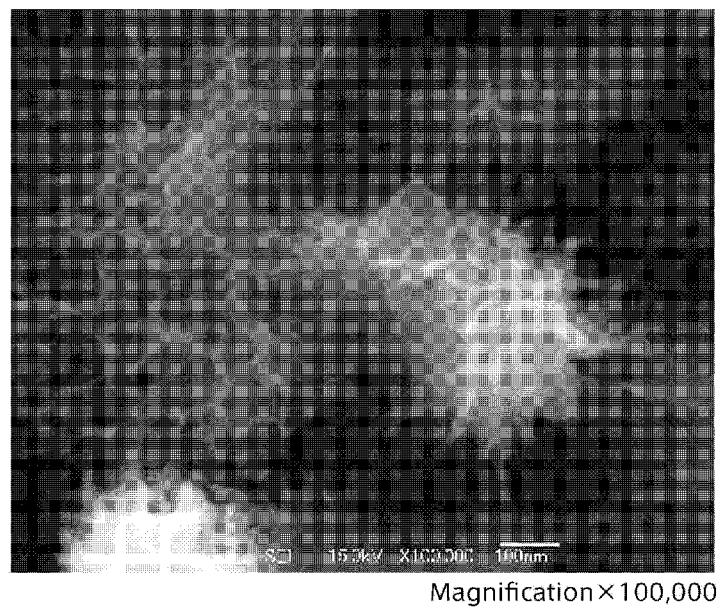
Figures 1, 11:
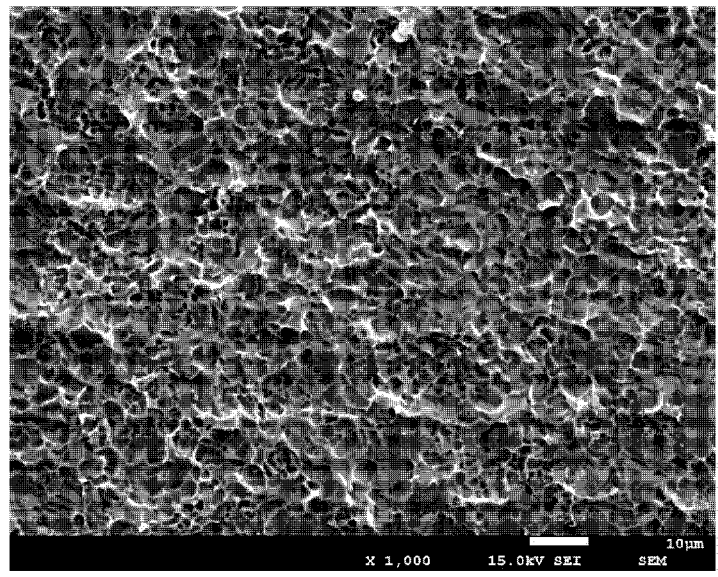
Figures 2, 11:
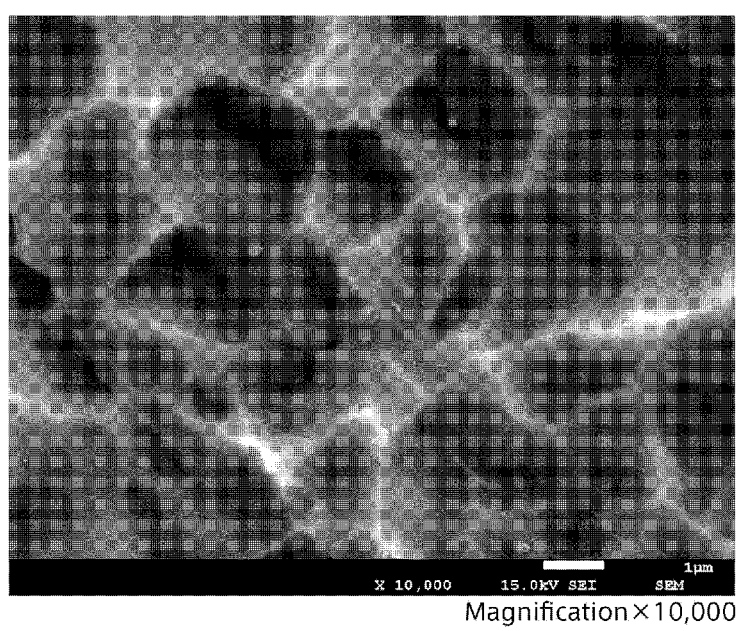
Figures 3, 11:
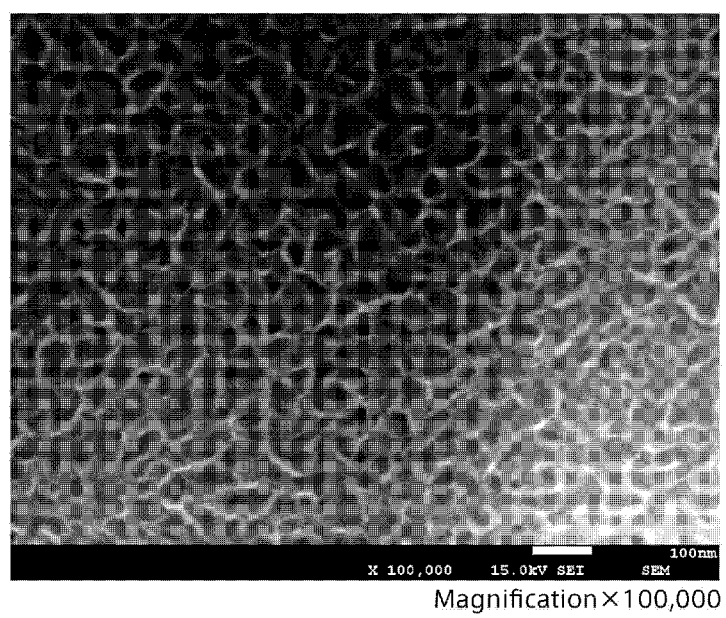

FIG. 11-1 to FIG. 11-3 are electron microscopic photographs of an α-β titanium alloy material "KS6-4" (made by Kobe-seikousho Co. Ltd. At Kobe. Hyogo Pref., Japan) treated according to New NAT with magnification of 1,000 times (FIG. 11-1), 10,000 times (FIG. 11-2) and 100,000 times (FIG. 11-3) respectively.

Figures 1, 12:
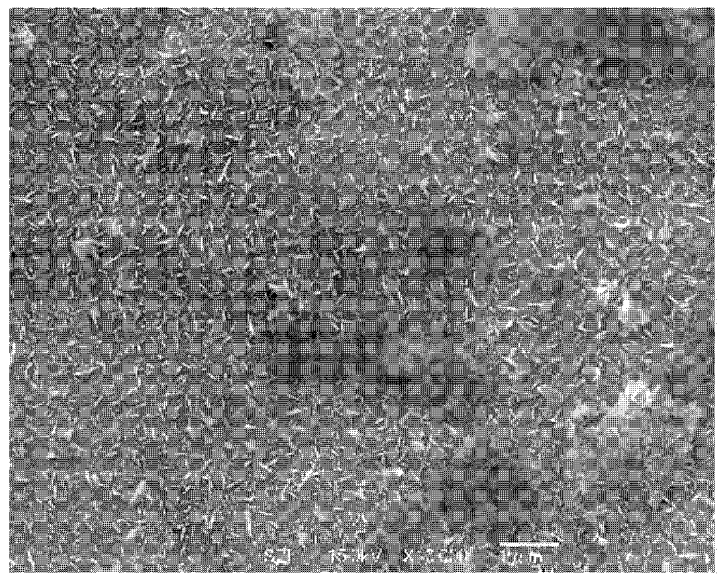
Figures 2, 12:
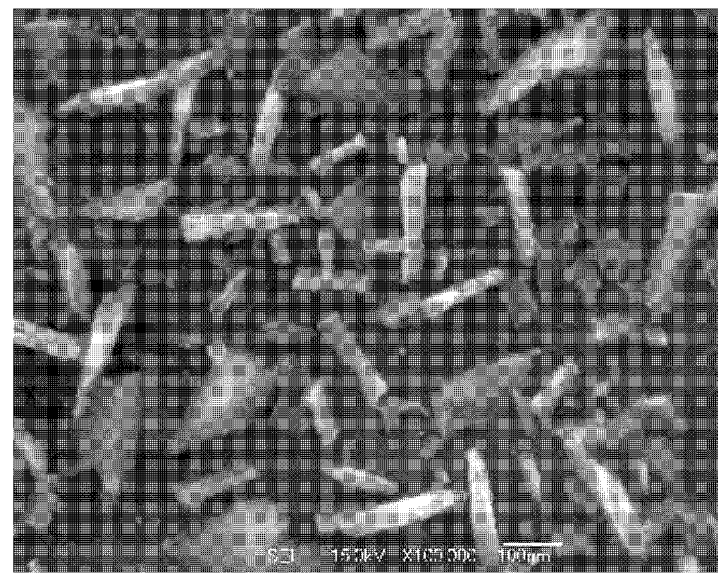

FIG. 12-1 to FIG. 12-2 are electron microscopic photographs of a tough pitch copper material "C1100" treated according to New NAT with magnification of 10,000 times (FIG. 12-1) and 100,000 times (FIG. 12-2) respectively.

Figures 1, 13:
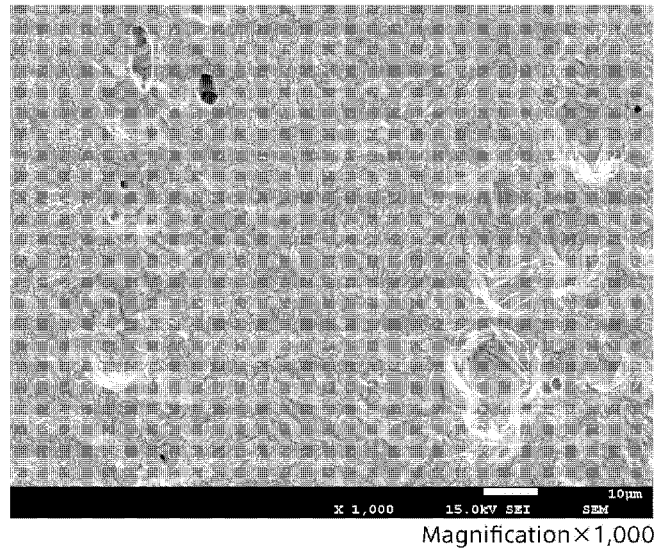
Figures 2, 13:
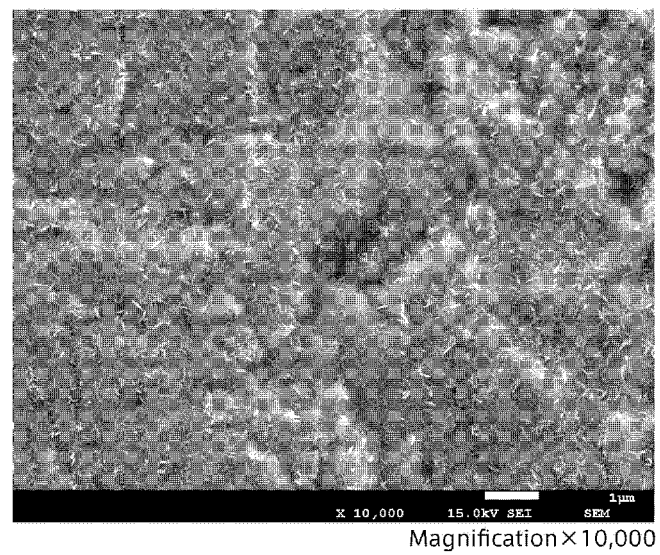
Figures 3, 13:
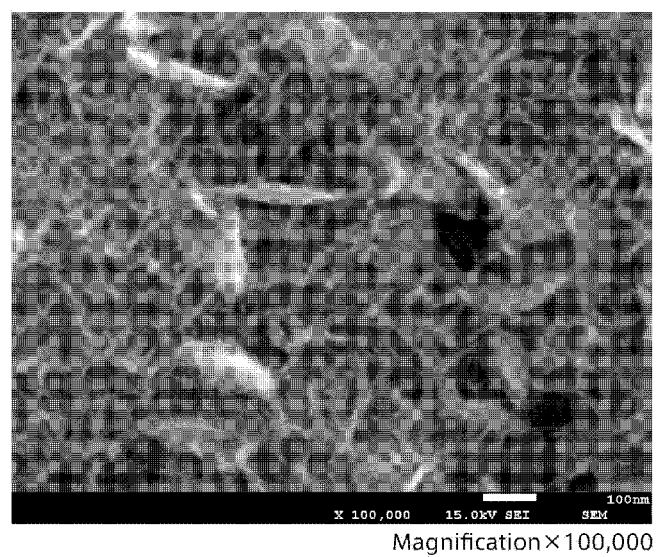

FIG. 13-1 to FIG. 13-3 are electron microscopic photographs of a tough pitch copper material "C1100" treated according to New NAT with magnification of 1,000 times (FIG. 13-1), 10,000 times (FIG. 13-2) and 100,000 times (FIG. 13-3) respectively.

Figure 14:
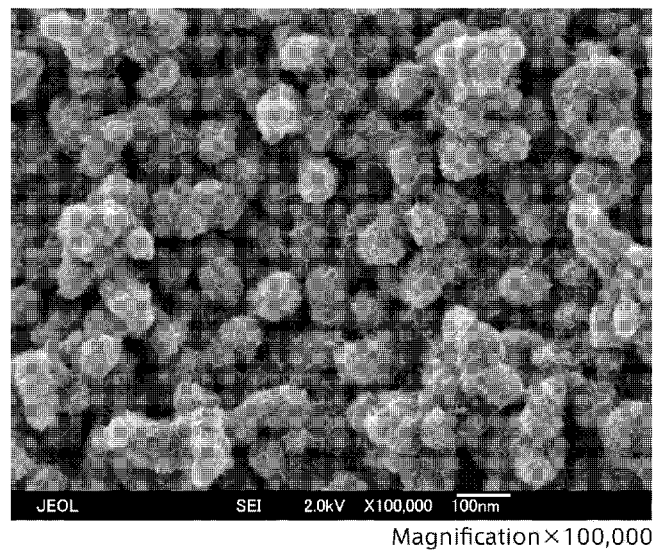

FIG. 14 is an electron microscopic photograph of a magnesium alloy material AZ31B treated according to NAT with magnification of 100,000 times.

Figure 15:
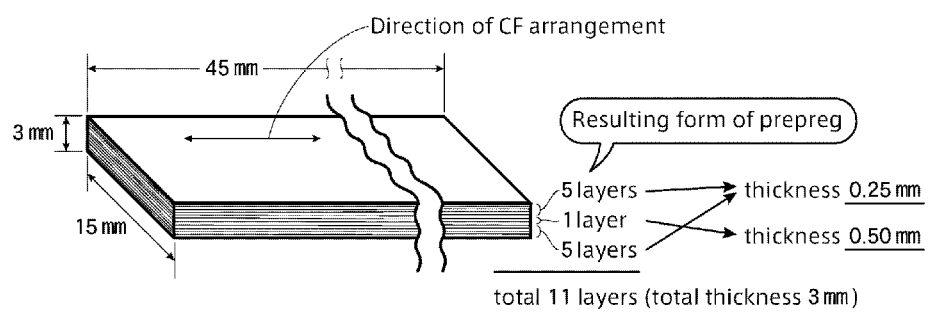

FIG. 15 is a view showing a visage of a CFRP piece used as a test piece partially cut away along with the direction of arrangement of carbon fibers in it.

Figure 16:
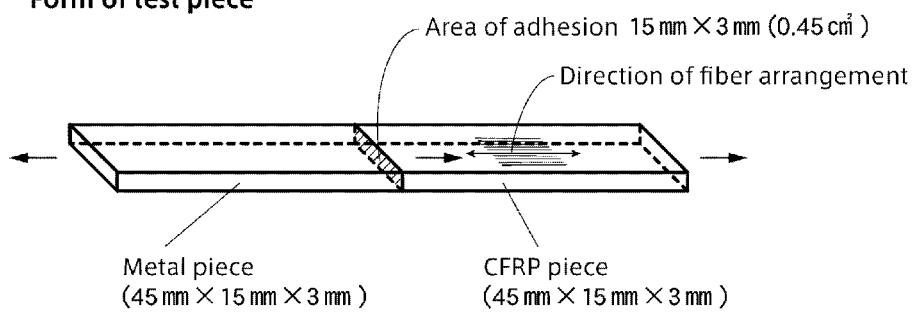

FIG. 16 is a view showing a visage of a test piece for measuring tensile strength of adhesion between a metal partial piece and a CFRP partial piece formed of the two partial pieces by adhesion.

Figure 17:
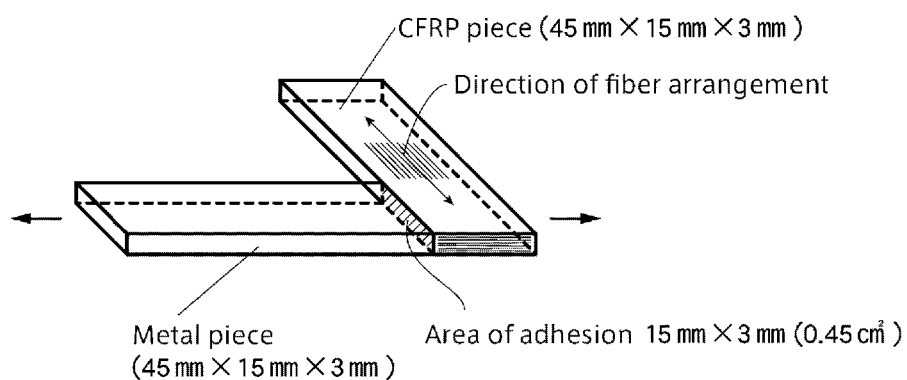

FIG. 17 is a view showing a visage of another test piece for measuring tensile strength of adhesion between a metal partial piece and a CFRP partial piece formed of the two partial pieces by adhesion.

Figure 18:
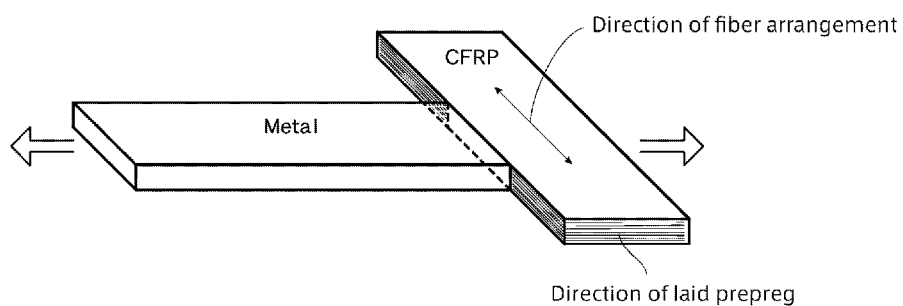

FIG. 18 is a schematic view showing one of two kinds of directions of lamination of carbon fiber bundles in a CFRP partial piece in the case where the test piece in the form shown in FIG. 17 is fabricated.

Figure 19:
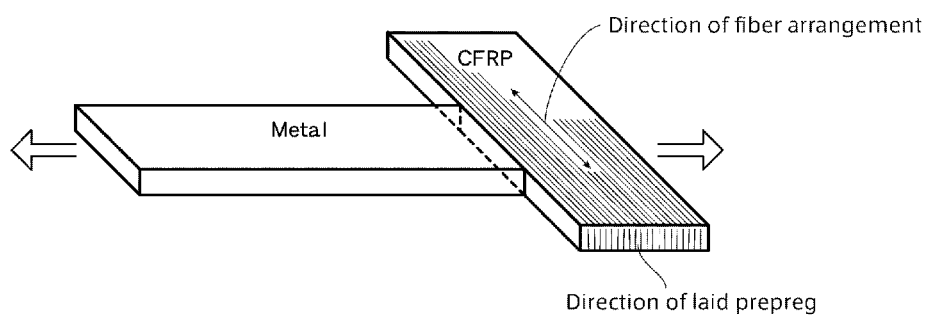

FIG. 19 is a schematic view showing the other of two kinds of directions of lamination of carbon fiber bundles in a CFRP partial piece in the case where the test piece in the form shown in FIG. 17 is fabricated.

Figure 20:
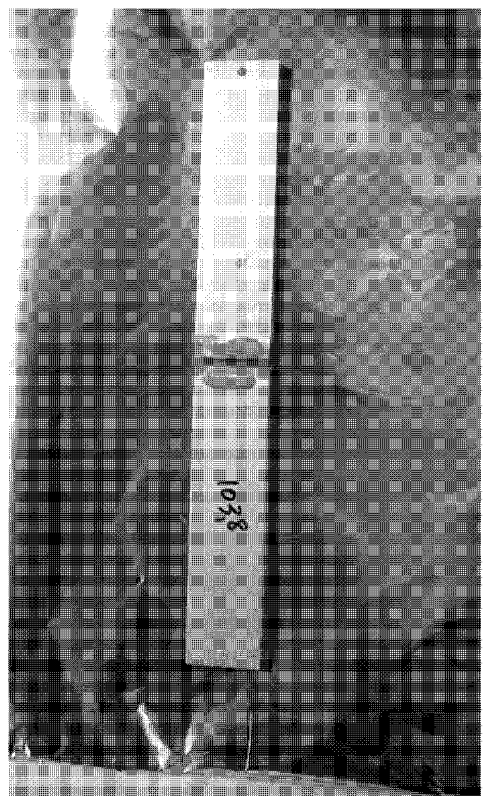

FIG. 20 is a photograph showing a visage of a test piece comprising two partial pieces of "Al-alloy A7075" for measuring tensile strength of adhesion in which a photograph of the partial pieces after test were taken in an arranged manner.

Figure 21:
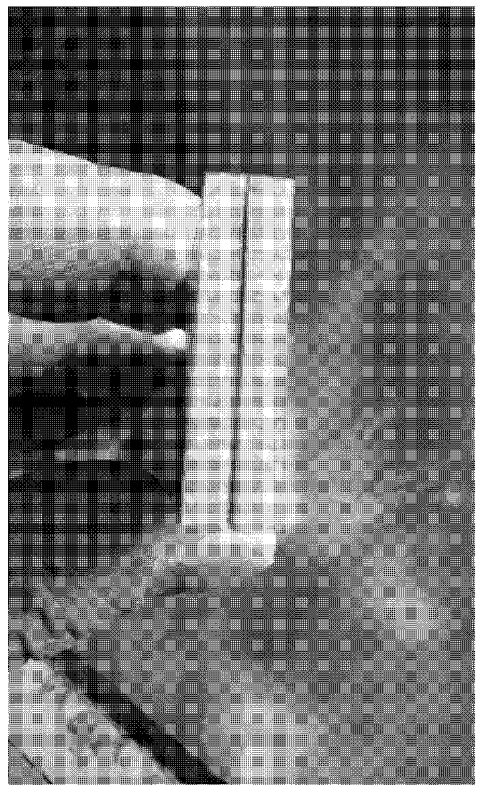

FIG. 21 is an enlarged photograph of respective faces of adhesion of the test piece shown in FIG. 20.

DETAILED EXPLANATION OF EMBODIMENTS (1) Various Metals and Chemical Treatment thereof (Treatment According to New NAT)

"Treatment according to New NAT" referred to in the present disclosure issues from the treatment method provided in the aforementioned NAT theory. The surface configuration of the materials treated according to New NAT includes configuration that does not necessarily require the condition "(1) the metal material has a roughened surface with convex-concave roughness of 0.8 to 10 μm (Rz) period (roughened surface of micron order period)" as one of the five conditions in the aforementioned treatment according to NAT. Then, the surface configuration formed through the treatment according to New NAT is defined as "a surface treated according to New NAT" and the method for forming the surface is defined as "treatment according to New NAT". The difference of "a surface treated according to New NAT" from a surface treated according to previous NAT consists in that the former does not actually require the first condition of NAT "the metal material has a roughened surface with convex-concave roughness of 0.8 to 10 μm (Rz) period (roughened surface of micron order period)". Further, the condition of NAT such that "(2) there is fine irregularities of 10 to 300 nm period on the above roughened surface" provided on the prerequisite condition (1) is also hard to say as a required condition. Rather, having shown that all examples of more concrete surface configuration with fine irregularities, the surface configuration itself becomes a required condition.

Figure 1A:
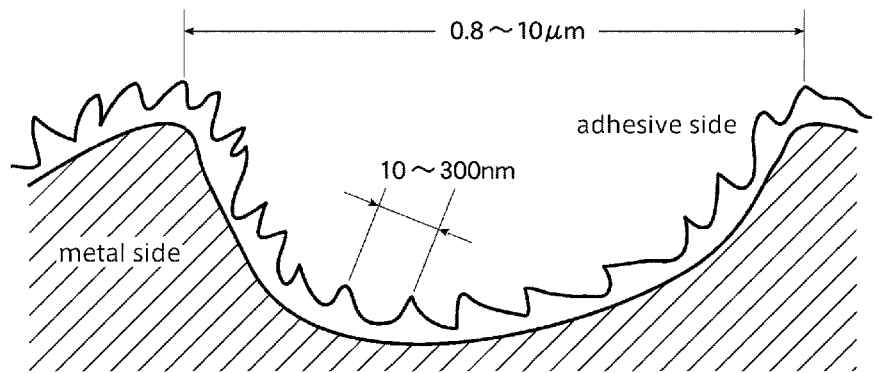
FIG. 1(a) is a sectional schematic view for explaining the principle of the present disclosure and for showing surface configuration of the metal part as "treated according to NAT" in the face of adhesion with cured adhesive in section.
Figure 1B:
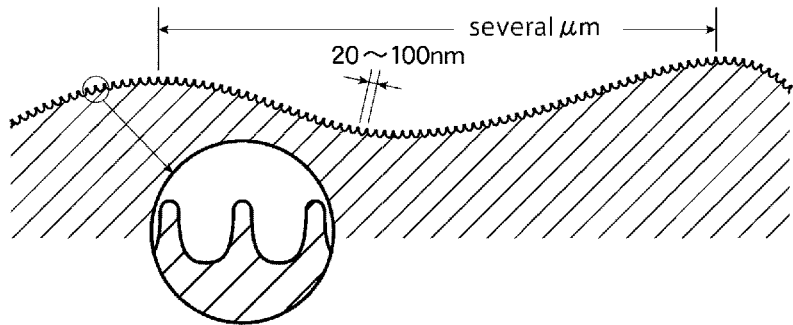
FIG. 1(b) is a sectional schematic view for explaining the principle of the present disclosure and for showing surface configuration of the metal part of "ultrafine concaves of bowl shape" in the face of adhesion with cured adhesive in section.
Figure 1C:
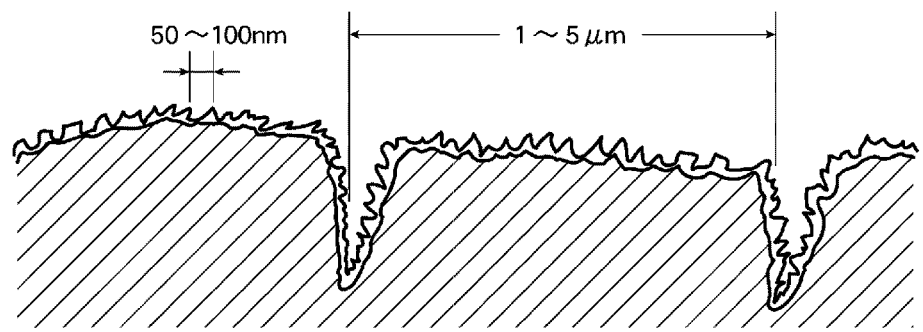
FIG. 1(c) is a sectional schematic view for explaining the principle of the present disclosure and for showing surface configuration of the metal part of "V-shaped valley type" in the face of adhesion with cured adhesive in section.
Figure 1D:
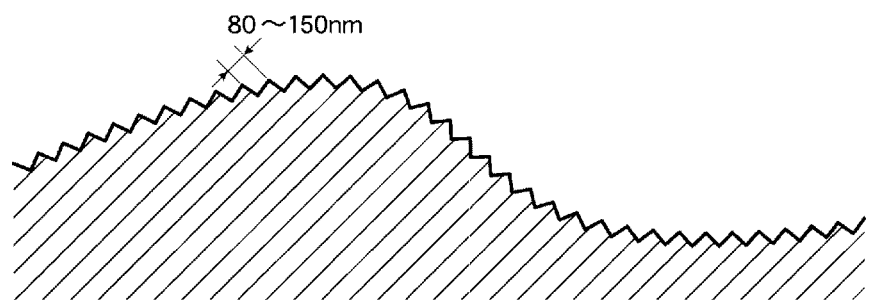
FIG. 1(d) is a sectional schematic view for explaining the principle of the present disclosure and for showing surface configuration of the metal part of "step-like shape" in the face of adhesion with cured adhesive in section.
Figure 1E:
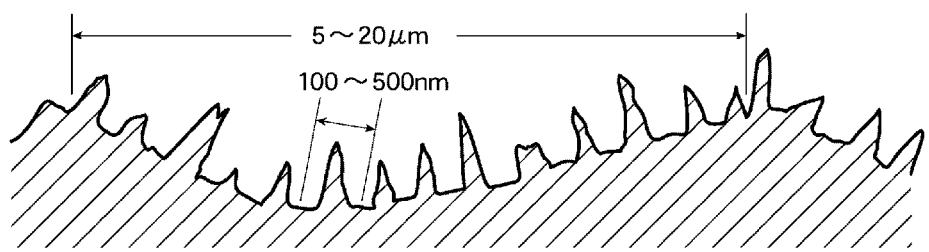
FIG. 1(e) is a sectional schematic view for explaining the principle of the present disclosure and for showing surface configuration of the metal part of "shape of mountains on a plain" in the face of adhesion with cured adhesive in section.
Figure 1F:
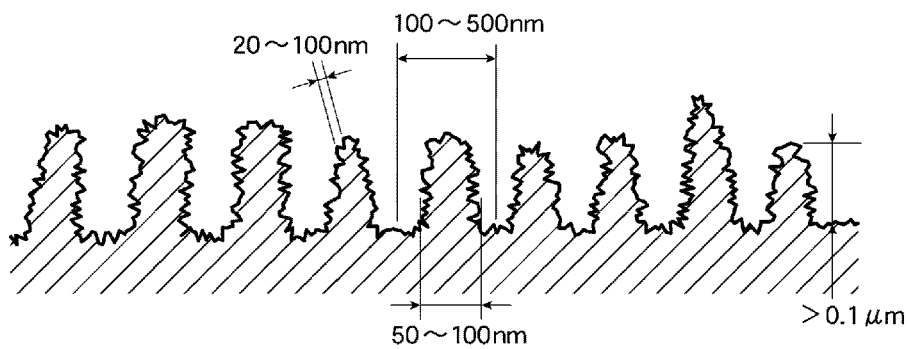
FIG. 1(f) is a sectional schematic view for explaining the principle of the present disclosure and for showing surface configuration of the metal part of "bar-like convex aggregate type" as an ideal type I in the face of adhesion with cured adhesive in section.
Figure 1G:
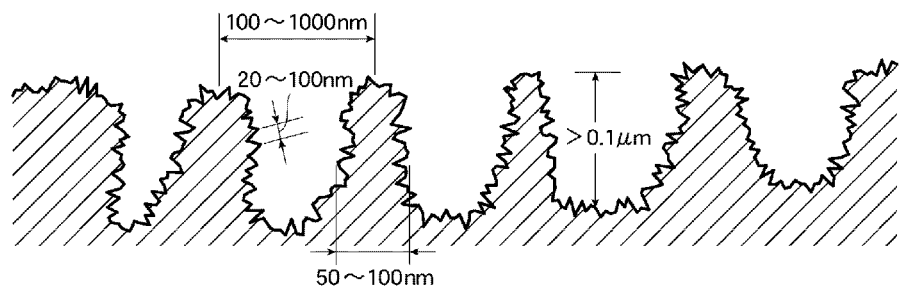
FIG. 1(g) is a sectional schematic view for explaining the principle of the present disclosure and for showing surface configuration of the metal part of "entangled U-shaped valley type" as an ideal type II in the face of adhesion with cured adhesive in section.
Figure 1H:
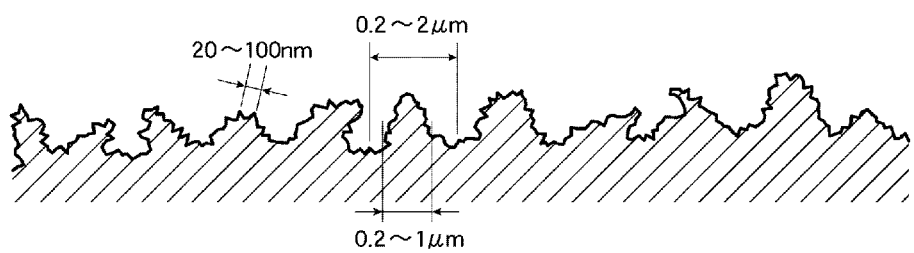
FIG. 1(h) is a sectional schematic view for explaining the principle of the present disclosure and for showing surface configuration of the metal part of "random type" as an ideal type III in the face of adhesion with cured adhesive in section.

To say about FIG. 1, the inventor supposes that the surface configurations shown in FIG. 1(b), FIG. 1(j), FIG. 1(k) and FIG. 1(l) do not require the surface to be a roughened surface of micron order. It is also considered that such surface configuration with a slack convex-concave of several μm period as shown in FIG. 1(b) happened to be formed when endeavors were made for causing the existing metal alloys to come nearer to be of such configuration. Further, the sectional configuration shown in FIG. 1(f) to FIG. 1(h) is supposed to be of very violently roughened surfaces of 0.1 to several μm period without regularity and a surface with ultrafine irregularities of 20 to 100 nm period is overlaid on this. This is of a shape quite different from the image of the dual irregularities in the condition according to NAT the inventor had estimated beforehand. Consequently, it can be said, in a direct expression, that the surface configuration required by "New NAT" according to the present disclosure is one that approximates to the schematic views shown in FIG. 1(b) and FIG. 1(f) to FIG. 1(l). As the required condition other than these, the condition such that the surface is covered with a ceramics such as metal oxide or metal phosphate is the same as one according to NAT.

(Metal Species Allowable for Use)

Substantially all of hard metal species can be used in the present disclosure. The present disclosure merely defines surface configuration of used metals and such usable metals include all species as long as they are hard metals. However, when metal species or metal alloy species have been selected arbitrarily, it would not be considered possible to make the surface configuration of all of the metal species or metal alloy species have surface configurations similar to those shown in FIG. 1(b), FIG. 1(f) to FIG. 1(l), even if it were tried. Even in trial and error, these ideal surface configurations could not been attained. The reason is such that some shaped articles with ultrafine irregularities giving a basis of the shown configuration were actually obtained for some metal species or metal alloy species through experiment and observation or were thought to be obtained. The shown schematic views of surface configuration were prepared presuming that the ideal sectional configuration for securing sufficient strength of adhesion would be such as these shown. That is, most of these were such as ones taken as models or ones depicted based on the experiences by the inventor. Only "random type" shown in FIG. 1(h) is depicted as a desk work.

Figure 1I:
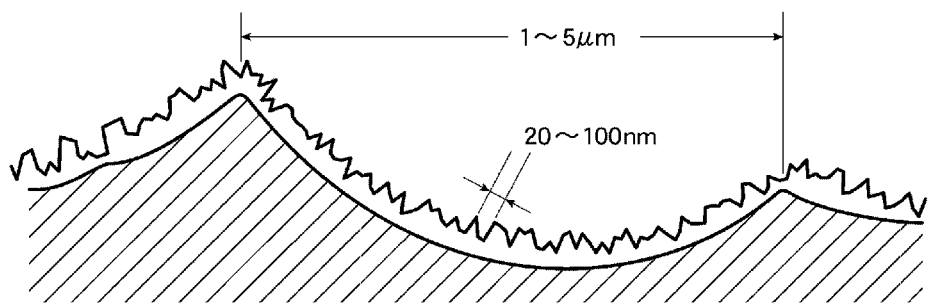
FIG. 1(i) is a sectional schematic view for explaining the principle of the present disclosure and for showing surface configuration of the metal part of "standard type" as an ideal type IV in the face of adhesion with cured adhesive in section.
Figure 1J:
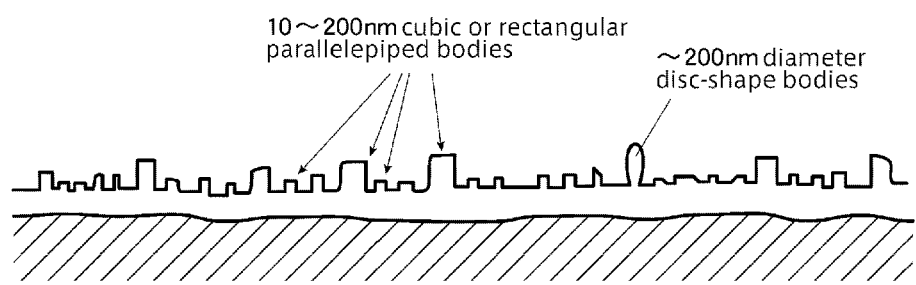
FIG. 1(j) is a sectional schematic view for explaining the principle of the present disclosure and for showing surface configuration of the metal part of "specific copper type" in the face of adhesion with cured adhesive in section.
Figure 1K:
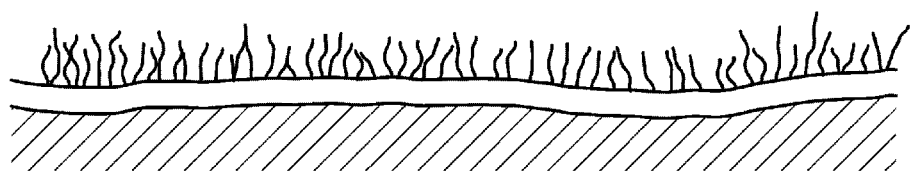
FIG. 1(k) is a sectional schematic view for explaining the principle of the present disclosure and for showing surface configuration of the metal part of "densely growing whisker type" in the face of adhesion with cured adhesive in section.
Figure 1L:
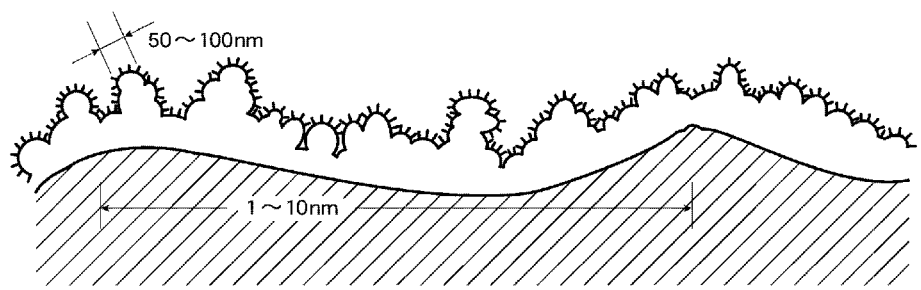
FIG. 1(l) is a sectional schematic view for explaining the principle of the present disclosure and for showing surface configuration of the metal part of "sphere and whisker type" in the face of adhesion with cured adhesive in section.

As explained above, the configuration shown in FIG. 1(b) comes from examples of Al-alloy, the configuration shown in FIG. 1(f) comes from examples of pure titanium, the configurations shown in FIG. 1(g) and FIG. 1(i) come from examples of titanium alloy, the configurations shown in FIG. 1(j) and FIG. 1(k) come from examples of copper and the configuration shown in FIG. 1(l) comes from examples of Mg-alloy. Consequently, the configuration shown in FIG. 1(l) is possible to be aimed at, if the used material is Al-alloy. However, it seems difficult, if other metal species are used.

The configuration shown in FIG. 1(f) is possible if pure titanium is used, and the configurations shown in FIG. 1(f) and FIG. 1(i) are possible if titanium alloy is used. The configurations shown in FIG. 1(j) and FIG. 1(k) are possible if copper is used, and the configuration shown in FIG. 1(l) is possible if Mg-alloy is used. Further, what is possible for all metal species is "the standard type" as an ideal type IV shown in FIG. 1(i).

The base of the standard procedures of treatment according to NAT disclosed in the Patent Documents 1 to 9 comprises four steps of (1) degreasing, (2) chemical etching, (3) fine etching and (4) surface hardening. Here, there are metal species with which the above fine etching and surface hardening can be performed simultaneously by chemical etching alone. On the other hand, there are cases in which development of treatment method must be given up without succeeding in fine etching of some metal species. Even in such cases, there are also many cases in which everything goes well by performing the surface hardening step beforehand when the fine etching has been taken as difficult. In short, the procedures involve all of unprecedented operations, most of which were clarified through trial and error without secure theoretical background and have not yet come to be explained by combination of simple methods.

(2) Epoxy Adhesives

The adhesive used in the present disclosure is a one-part epoxy adhesive and most of ones commercially available in common can be used. When the composite piece formed by adhesion of a metal piece subjected to treatment according to NAT or New NAT and another adherend piece by use of the adhesion method described later (referred to as "NAT adhesion method" below) was broken by pulling out the composite piece and its shear strength of adhesion is measured, the shear strength of adhesion under an ordinary temperature was within a range of 60 to 80 MPa for most of commercially available adhesives, and in most cases it was near to 70 MPa. In short, the strength of adhesion under an ordinary temperature does not exhibit so much variation among commercially available one-part adhesives and the strength with same adhesive used hardly depends on metal species or metal alloy species. Here, the one-part thermosetting epoxy adhesives the inventor et. al. usually use are "EP106NL" (made by Cemedine Co. Ltd, Main company in Tokyo, Japan) and "Scotch Weld EW2040" (made by Three M Japan Co. Ltd.: Main company in Tokyo, Japan), both of which are of dicyandiamide-curable type.

Here, use of the above "EW2040" is preferable, if not only the strength of adhesion under an ordinary temperature but also the strength of adhesion under a high temperature, for example, of 150° C. is important. That is, using this adhesive in NAT adhesion of two pieces of Al-alloy A7075 subjected to treatment according to NAT, shear strength of 35 MPa under 150° C. was recorded. The adhesive that has the highest strength of adhesion under 150° C. is a one-part epoxy adhesive prepared by the inventor (Patent Document 10), which exhibited about 45 MPa. However, as market of this field has not been formed yet, the inventor does not produce this adhesive now.

(3) Operation of Adhesion

While an "operation of impregnation" is necessary in NAT adhesion method, this is similar for the New NAT method according to the present disclosure. The "operation of impregnation" is an operation of allowing an adhesive to penetrate into the ultrafine concaves on the surface of the metal piece by intentionally lowering viscosity of the one-part epoxy adhesive that is viscous in an ordinary temperature. Specifically, there are two ways of (a) using a closed container, and (b) using a ketone solvent, as following.

(a) Using a Closed Container

The required portion of each of metal pieces is painted with an adhesive, after which the metal pieces are placed in a desiccator heated to 50 to 70° C. preliminarily and the pressure in the desiccator is reduced with a vacuum pump. After pressure reduction is performed for several minutes, air is introduced to resume the ordinary pressure. After then, pressure is reduced again. Thus, operation of pressure reduction/resumption to ordinary pressure is repeated several times, after which the metal pieces are taken out of the desiccator. The adhesive, which is paste-like originally, apparently has once come to be in a liquid state. Then, joining one metal piece with adhesive coated with another, the face of adhesion is fixed using a clip, a vice, or the like and the paired pieces are placed in a hot air drying machine as such for a curing step.

(b) Using a Ketone Solvent

The above method (a) requires extremely large bags, autoclaves, or the like, if metal pieces are of a large scale, thus making it difficult to performing the method in a commercial manner. This method of using a bath liquid of a ketone is devised in such a circumstances and is very efficient, although it is only applicable to the case where the used adhesives are ones of one-part epoxy adhesives of a dicyandiamide-curable type. Here, as most of commercially available one-part epoxy adhesives are of a dicyandiamide-curable type, almost all of them actually can be used (Patent Documents 11 and 12). Specific manners of the method using a bath liquid of a ketone are as follows.

At first, a small amount of methyl-isobutyl-ketone (MIBK) is added to a one-part adhesive, which is then mixed well to become a suspension with low viscosity. The required portion of each of metal pieces is painted with the above suspension and then the metal pieces are placed in a warm air drying machine for about 20 minutes to cause the solvent to be volatilized completely. This is a step of "impregnation treatment". This "impregnation treatment" by use of MIBK has importance in the present disclosure, the reason of which is such that the treatment is practical and also impregnation is performed more securely than the method using a closed container. Here, the key point of secure impregnation consists in a solvent volatilization step with a warm air drying machine and in securing sufficient time for drying with sufficient ventilation in the drying machine. Further, if the adhesive on a metal piece is taken as thin and little, then the metal piece is additionally painted with the original adhesive to be thicker. After then, one metal piece with adhesive painted thereon is caused to abut closely on another metal piece with adhesive painted thereon and the paired piece, having been fixed with small fixing jig, is placed in a hot air drying machine for a curing step.

(Heat Curing and Procedure Against Flowing Away)

A common curing method is used as one for curing a one-part epoxy adhesive. That is, a standard curing procedure is such that a hot air drying machine is set at a temperature of 120 to 135° C., then paired metal pieces fixed by clip, etc., are placed in the hot air drying machine, temperature is raised by immediately setting the temperature of 170° C., the situation is kept for 20 minutes after the temperature attained 170° C., and then curing operation ends. Here, actual operation of adhesion requires various techniques and skills.

In the case of adhesion of large scale articles, techniques, skills and devices are required as to what thickness of an adhesive layer is suitable, whether there are concave-convex in the gap space on the face of adhesion where adhesive can exist or not, whether adhesive that has melt and become liquidized flows away from the face of adhesion and is missed or not, or the like. In short, as even an adhesive with high viscosity once becomes liquid-like at a temperature of 60 to 90° C., such cases occur frequently that the adhesive flows away from the place where to be solidified and the operation ends in a failure. Consequently, it is necessary to surround the circumference of the face of adhesion with a TEFRON tape in a fastened state. Further, it is important also to apply the adhesive in surplus on the face of adhesion beforehand, supposing decrease of adhesive on the face of adhesion by flowing out of somewhat adhesive.

The operation of winding and fastening the TEFRON tape for sealing off adhesive is effective in a case where the distance between the pair of metal pieces (test pieces) cannot be small with a complementary jig, that is, the thickness of the adhesive layer to be cured cannot be restrained within 0.1 to 0.3 mm. In other words, the TEFRON tape is useful in the case where the adhesive layer cannot help being thick. This is because adhesive itself expands during heat curing with the adhesive sealed under pressure and inner pressure increases due to the confined state, thus restraining voids, which are formed by evaporation of certain impurities, a tiny amount of water, etc., from being generated within the cured entity, rather than it is aimed at procedure against flowing away. Consequently, in order to form an adhesive layer without voids, a preliminary working operation is important such that at least the surfaces of the paired metal pieces to be joined by adhesion are flattened to have no irregularities with a milling machine or the like and the gap between the paired metal pieces are made as small as possible when the faces with adhesive applied on have been caused to abut on each other.

The one-part epoxy adhesive used in the present disclosure is subjected to "impregnation treatment" as explained above. In this, when a pair of metal pieces that have been painted with adhesive are caused to abut and fixed, there is a way of sandwiching a film-shaped epoxy adhesive between the metal pieces. This is a method in which the one-part epoxy adhesive according to the present disclosure is used as a primer and a film-shaped adhesive laminated on it is used as a main adhesive. Such film-shaped adhesives are used frequently that are formed by impregnating a nonwoven fabric of nylon or the like with one-part epoxy adhesive. Here, the nonwoven fabric prevents the adhesive ingredient from flowing away in curing under raised temperature and the reinforcing fiber serves for solving the problem such that strength of the cured entity in adherend is lowered due to generation of voids. Consequently, it can be used also in the present disclosure.

Here, when the two metal pieces were joined by adhesion with a commercially available film-shaped adhesive, most of which are specified for aircrafts made in USA, sandwiched between the metal pieces, the strength of adhesion is lowered, as compared with the strength of adhesion of the metal pieces joined by use of a one-part epoxy adhesive "Scotch Weld EW2040" alone, according to the experiment performed by the inventor. While this is a result regarding currently available film-shaped adhesives, commercially available film-shaped adhesives will be changed to have high performance, if the present disclosure comes to be widely applied to moving machine manufacturing industry. To say regarding this, the strength of adhesion before NAT theory proposed by the inventor was at most 30 to 40 MPa and there was not a standard method for measuring strength of adhesion higher than 40 MPa. Consequently, if existence of strength of adhesion far higher than this is clarified by dissemination of NAT theory and the present disclosure, new development by adhesive manufacturers will begin. In short, saying at present, the method of using a film-shaped adhesive is superior in operation against flowing away of adhesive. While strength of adhesion itself decreases by sandwiching a film-shaped adhesive, this can be improved conveniently.

(Method for Adhesion of a Metal Piece and a CFRP Piece)

When a CFRP piece that has been already shaped and cured is used as one of pieces to be joined by adhesion, the portion of adhesion is ground with a sand-paper, etc., preferably to an extent that a part of CF is exposed. It is preferable that the CFRP piece after having been ground is immersed in a resin bath, rinsed with water to get rid of dirt and then dried in a hot air drying machine. After then it is also preferable to perform "impregnation treatment" in a similar manner as in the above operation of adhesion of metal pieces. A CFRP piece with adhesive painted thereon is formed through the operation. After then, this CFRP piece and a metal with adhesive painted thereon are caused to abut on each other, fixed by use of a jig for adhesion, etc., and placed in a hot air drying machine to cause adhesive to be cured, in a similar manner as described above.

On the other hand, in the case where the adherend to be joined with a metal piece by adhesion is a CFRP prepreg composite, there is no operation to be performed on the side of CFRP. The metal piece with adhesive painted thereon obtained through the above operation is placed on the designated position of a prepreg composite placed in a mold and the mold is fastened. Then, the mold with the metal piece and prepreg composite therein is placed in an autoclave and a predetermined operation of curing CFRP is performed. Here, as among CFRP prepregs there are some that are of a type cured at a low temperature of 130° C., it is preferable to raise the temperature up to 170° C. even for a test piece in which such a CFRP prepreg is used and keep the situation at least 15 minutes.

(4) Cured Entity of Thermoplastic Epoxy Resin Composition

In order to measure the strength of adhesion of test piece formed by joining paired metal pieces subjected to NAT treatment with adhesive, a test piece comprising paired metal pieces joined by adhesion with a one-part epoxy adhesive were broken through pulling off in test to obtain strength of adhesion. The strength of adhesion obtained here is one between the metal pieces and also one between each metal piece and the cured adhesive. On the other hand, the strength of adhesion obtained at tensile breaking of a test piece joined by adhesion of a metal piece subjected to NAT treatment and a CFRP piece is one between the metal piece and CFRP piece. At the same time, this strength of adhesion is also one between the cured adhesive and CF. Further to say, this is one between the matrix resin within the cured adhesive and CF. The reason is as explained above.

In short, the strength of adhesion between CF and matrix resin (that is also a thermosetting epoxy resin composition) remains currently in a level of about 40 MPa. Improvement of strength of adhesion between the matrix resin within CFRP and CF remains in a limit such that the strength is raised to about 60 MPa by use of a conventional type of CF having a large surface area.

However, some different reinforcing fibers beside CF may further appear in future and the strength of adhesion between CF and cured epoxy resin as a matrix resin may become comparable to the tensile strength of the cured epoxy resin itself with improvement in surface treatment method of CF.

In such a case, the strength of adhesion of a piece obtained by adhesion according to NAT of paired pieces of the CFRP with a one-part epoxy adhesive may have the same value of shear strength or tensile strength of the one-part epoxy adhesive itself. Anyway, the highest shear strength of adhesion and the highest tensile strength of adhesion that the piece (test piece) formed by adhesion of paired pieces attains cannot be beyond the shear strength and tensile strength of the cured one-part epoxy adhesive itself respectively.

(Tensile Strength of Cured Adhesive)

Even if the adherend is a metal piece subjected to New NAT treatment according to the present disclosure, the shear strength of adhesion and tensile strength of adhesion of the piece formed by adhesion according to NAT of the metal pieces cannot be beyond the shear strength and tensile strength of the cured one-part epoxy adhesive itself respectively. Consequently, it is important to obtain shear strength and tensile strength of a cured adhesive beforehand and to know to what an extent metal adhesion techniques have approximated the ideal values or the highest values.

Although the inventor et al. performed experiments in many times for obtaining the tensile strength of the cured commercially available adhesives "EP106NL" and "EW2040" themselves as on-part epoxy adhesives, all of them resulted in failure. Preparing a shaped article of adhesive in a method by pouring into a mold was tried in which a mold coated with TEFRON is formed and then loaded with adhesive therein. But the prepared shaped article for measuring tensile strength exhibited 60 MPa at most and small voids were generated even in the shaped article with the highest tensile strength. The mold that has been loaded with adhesive was placed in a hot state desiccator and operation of pressure reduction by a vacuum pump and resumption to ordinary pressure with addition of air was repeated (that is, operation similar to "impregnation treatment" was performed), the mold loaded with adhesive was taken out of the desiccator, a lid was placed on the mold and fixed by a jig with the adhesive partially spilt and the mold was placed in a hot air drying machine to be cured. Nevertheless, generation of small voids could not be prevented.

Therefore, it was considered that samples appreciated as usable for measurement of tensile strength could not be prepared without performing the curing in an autoclave method in a similar manner as when CFRP prepreg is cured. Although this operation is required for verifying New NAT theory, it is regrettably not necessarily required for verifying effectiveness of the present disclosure. Thus, the inventor gave it up from the standpoint of an engineer in a firm. On the other hand, FIGS. 20 and 21 show photographs of the adhering face in trace of a test piece formed by adhesion of paired AL-alloy A7075 pieces in dimensions of 100 mm×25 mm×3 mm with the above "EW2040" according to the present disclosure and exhibiting tensile strength of adhesion of 103 MPa (at the temperature of 18° C.). This broken face is a face of broken resin viewed with a magnifier and such site could not be seen where metal phase is exposed. Most area of the broken face seemed to be of the broken resin layer adhering to the metal and the tensile strength of the cured "EW2040" was presumed to be almost near the value in breaking of the cured adhesive itself as above described.

(5) Measurement of Strength of Adhesion

Methods for measuring shear strength of adhesion and tensile strength of adhesion of articles joined by adhesion are specified in JISK 6849 (ISO 6922) and JISK 6850 (ISO 4587), respectively. However, as explained above, the strength of adhesion of an article (test piece) formed by joining paired metal pieces subjected to NAT treatment or New NAT treatment with a one-part epoxy adhesive cannot be measured in these standard methods by JIS (ISO). Then, configuration of an article (test piece) formed by adhesion of metal pieces or of a metal piece and a CFRP piece with an adhesive, which the inventor used for measurement, is shown in FIGS. 2 and 3. FIG. 2 shows one for measuring shear strength of adhesion and FIG. 3 shows one for measuring tensile strength of adhesion.

BEST MODE FOR CARRYING OUT THE DISCLOSURE

The manner of carrying out the present disclosure will be explained with embodiments below.

(a) Observation with an Electron Microscope

Observation was made using an electron microscope of a SEM (scanning electron microscope) type: "S-4800" (made by Hitachi-seisakusho Co. Ltd., main company in Tokyo, Japan) and "JSM-6700F" (manufactured by Nihon-denshi Co. Ltd., main company in Tokyo, Japan) in 1 to 2 kV.

(b) Observation with a Scanning Probe Microscope

"SPM-9600" (manufactured by Shimadzu-seisakusho Co. Ltd., main company in Tokyo, Japan) was used.

(c) Measurement of Joining Strength of Composites

Using a tensile testing machine "AG-500N/1kN" (manufactured by Shimadzu-seisakusho Co. Ltd., main company in Tokyo, Japan), shear breaking strength was measured at a tension speed of 10 mm/min.

Preliminary Preparation for Experiment: Obtaining CFRP Pieces

The inventor received a supply of plenty of CFRP pieces with a dimension of 45 mm×15 mm×3 mm (thickness) that seems to contain CF by 45 to 50% (wt %: similar as referred to also for solution below) from Toray Co. Ltd. (main company in Tokyo, Japan; referred to as Toray, below) in years of 2011 to 2011. One half of it is "Torayca T800" (made by Toray) as one in which CF of high strength is used. Its tensile strength is 5.9 GPa. The other half is "Torayca T300" (made by Toray) with a tensile strength of 3.5 GPa, as one made using a previous type of CF having a tensile strength of about half of the above CF according to requirement by the inventor. The epoxy resin used as the matrix resin of these CFRP pieces seems to be a resin "No. 2500" or "No. 2580" in the catalogue of Toray, either of which is not of a grade providing heat resisting property. That is, as construed, while the composition of the prepreg, approximating one of a one-part epoxy adhesive, is of dicyandiamide-curable type, it is also one of such a kind that curing temperature is lowered to a level of 130° C. by adding a curing promoting agent.

Here, the matrix resin used for CFRP of a grade providing heat resisting property is ordinarily a copolymer of an epoxy resin and an aromatic diamine and the tensile strength of its cured entity is rather high at a temperature below 200° C., if the monomer is suitably selected. These are used in CFRP prepregs for aircrafts, among which ones having the highest heat resisting property do not seem to be disseminated in the common. Further, the tensile strength, etc., of the cured thermosetting resins prepared from epoxy resin and aromatic diamine is disclosed in Patent Document 14. Most of the cured resins here have tensile strength of 55 to 60 MPa, which is lower than the tensile strength at an ordinary temperature of the cured epoxy adhesive "EW2040" the inventor used, as presumed to be about 100 MPa: see Experiment example 7).

Further, the tensile strength of the cured one-part epoxy adhesive "EP106NL" used in most multipurpose manners in Japan seems to be comparable with the above and the inventor construe that this is a mean tensile strength of the cured epoxy resin of a dicyandiamide-curable type. In short, as to the strength of the cured epoxy resin at an ordinary temperature, the strength of an epoxy resin of a dicyandiamide-curable type is higher than the strength of a copolymer of an epoxy resin and an aromatic diamine, but these become in the reversed relation at a high temperature.

Here, regarding laminated structure of the acquired CFRP pieces, the CFRP is formed so as to consist of 11 layers of prepreg containing CF bundles collected in a plane direction with CFs arranged in the longitudinal direction and the thickness of each layer in the cured state is 0.25 mm for 10 layers and 0.5 mm for the central layer (see FIG. 15).

EXPERIMENT EXAMPLE 1

NAT Treatment of Al-Alloy

Sheet stocks of Al-alloy A7075 having a thickness of 3 mm were acquired and machined to form a plurality of small pieces with a dimension of 45 mm×15 mm×3 mm. Further, a plurality of small pieces with a dimension of 100 mm×25 mm×3 mm were formed by machining from the same Al-alloy sheet stocks. An aqueous solution containing degreaser for aluminum "NE-6" (made by Meltex co. Ltd., main company in Tobkyo, Japan) by 10% was made ready to be at 60° C. in a tank, in which the above alloy pieces were immersed for 5 minutes, and after then the pieces were rinsed with tap water (Ota city, Gumma prefecture, Japan). Next, an aqueous solution of hydrochloric acid having a concentration of 1% was made ready to be at 40° C. in another tank, in which the pieces were immersed for 1 minute and after then the pieces were rinsed with water. Next, an aqueous solution of caustic soda having a concentration of 1.5% was made ready to be at 40° C. in still another tank, in which the pieces were immersed for 4 minutes and after then rinsed with water.

Figure 4:
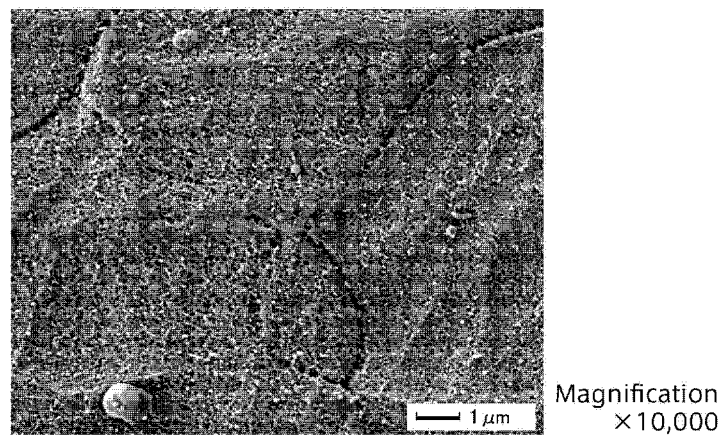
FIG. 4 is electron microscopic photographs of an Al-alloy material A7075 treated according to NAT with magnification of 10,000 times and 100,000 times respectively.
Figure 4:
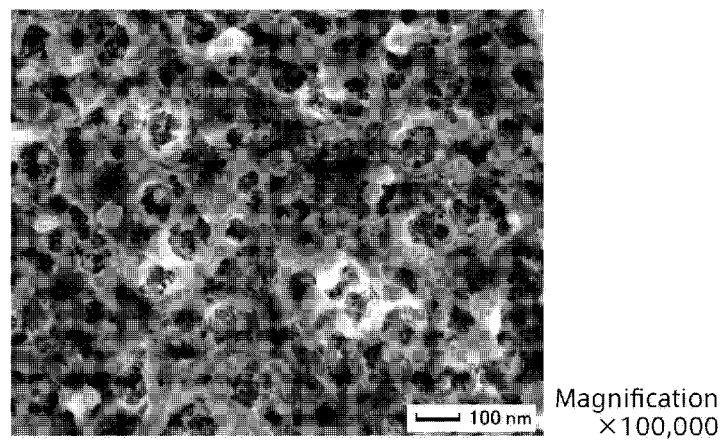

Further, an aqueous solution of nitric acid having a concentration of 3% was made ready to be at 40° C., in which the alloy pieces were immersed for 3 minutes and after then rinsed with water. Next, an aqueous solution of hydrazine hydrate having a concentration of 3.5% was made ready to be at 60° C., in which the alloy pieces were immersed for 2 minutes. Next, an aqueous solution of hydrazine hydrate having a concentration of 0.5% was made ready to be at 40° C., in which the alloy pieces were immersed for 0.5 minutes and after then rinsed with water. Next, the pieces were placed in a warm air drying machine set to be at 67° C. for 15 minutes for drying. After drying, the alloy pieces were collected together, wrapped with aluminum foil and then placed in a plastic bag, which was closed and stored. FIG. 4 shows an electron microscopic photograph (magnification of 10,000 times and 100,000 times) of the surface of Al-alloy A7075 subjected to the same treatment as the above. The schematic view of FIG. 1(b) was presumed seeing this photograph along with other material (Patent Document 13).

EXPERIMENT EXAMPLE 2

New NAT Treatment of Al-Alloy

Sheet stocks of Al-alloy A7075 having a thickness of 3 mm were acquired and machined to form a plurality of small pieces with a dimension of 45 mm×15 mm×3 mm. Further, a plurality of small pieces with a dimension of 100 mm×25 mm×3 mm were formed by machining from the same Al-alloy sheet stocks. An aqueous solution containing degreaser for aluminum "NE-6" by 10% was made ready to be at 60° C. in a tank, in which the above alloy pieces were immersed for 5 minutes, and after then the pieces were rinsed with tap water (Ota city, Gumma prefecture, Japan). Next, an aqueous solution of hydrochloric acid having a concentration of 1% was made ready to be at 40° C. in another tank, in which the pieces were immersed for 1 minute and after then the pieces were rinsed with water. Next, an aqueous solution of caustic soda having a concentration of 1.5% was made ready to be at 40° C., in which the alloy pieces were immersed for 4 minutes and after then rinsed with water.

Figure 5:
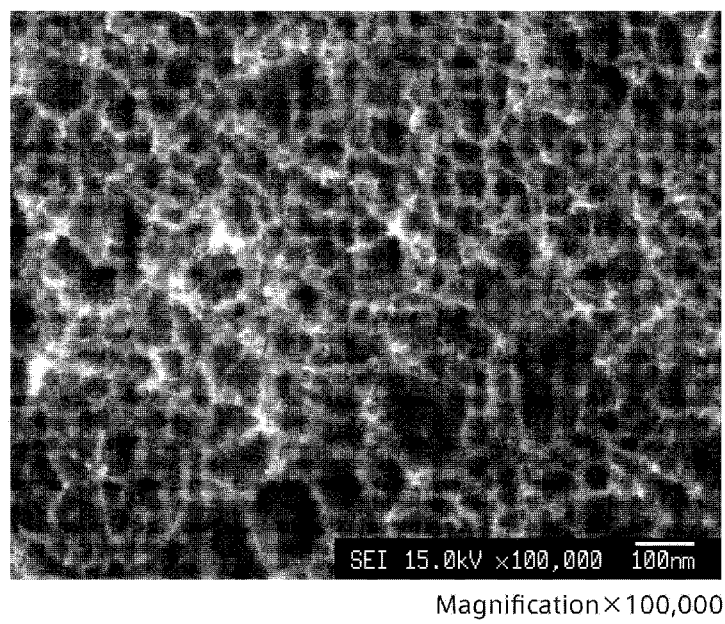
FIG. 5 is an electron microscopic photograph of an Al-alloy material A7075 treated according to New NAT with magnification of 100,000 times.

Further, an aqueous solution of nitric acid having a concentration of 3% was made ready to be at 40° C., in which the alloy pieces were immersed for 3 minutes and after then rinsed with water. Next, an aqueous solution of hydrazine hydrate having a concentration of 3.5% was made ready to be at 60° C., in which the alloy pieces were immersed for 1 minute. Next, an aqueous solution of hydrazine hydrate having a concentration of 0.5% was made ready to be at 33° C., in which the alloy pieces were immersed for 3 minutes and after then rinsed with water. Next, an aqueous solution of hydrogen peroxide having a concentration of 1.5% was made ready, in which the alloy pieces were immersed for 0.5 minute and after then rinsed with water. Next, the pieces were placed in a warm air drying machine set to be at 67° C. for 15 minutes for drying. After drying, the alloy pieces were collected together, wrapped with aluminum foil and then placed in a plastic bag, which was closed and stored. FIG. 5 shows an electron microscopic photograph (magnification of 100,000 times) of the surface of Al-alloy A7075 subjected to the same treatment as the above. This treatment method of Al-alloy corresponds to one changed from one in Experiment Example 1 considering the latter has not attained sufficiently the sectional schematic view of FIG. 1(b) yet.

EXPERIMENT EXAMPLE 3

NAT Treatment of Stainless Steel (Referential Example)

Sheet stocks of stainless steel SUS304 having a thickness of 3 mm were acquired and machined to form a plurality of small pieces with a dimension of 45 mm×15 mm×3 mm. Further, a plurality of small pieces with a dimension of 100 mm×25 mm×3 mm were formed by machining from the same stainless sheet stocks. An aqueous solution containing degreaser for aluminum "NE-6" (made by Meltex co. Ltd., main company in Tokyo, Japan) by 10% was made ready to be at 60° C. in a tank, in which the above steel pieces were immersed for 5 minutes, and after then the pieces were rinsed with tap water (Ota city, Gumma prefecture, Japan). Next, an aqueous solution of caustic soda having a concentration of 1.5% was made ready to be at 40° C. in another tank, in which the steel pieces were immersed for 1 minute and after then rinsed with tap water. Next, an aqueous solution of sulfuric acid having a concentration of 5% was made ready to be at 65° C., in which the steel pieces were immersed for 4 minutes and after then rinsed with water.

Figure 6:
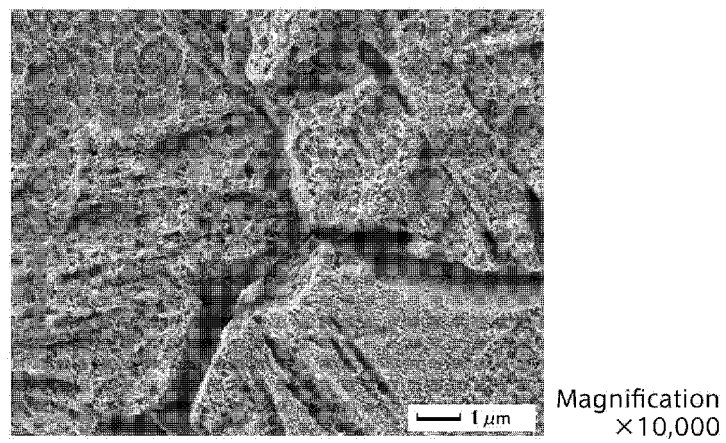
FIG. 6 is electron microscopic photographs of a stainless steel material SUS304 material treated according to NAT with magnification of 10,000 times and 100,000 times respectively.
Figure 6:
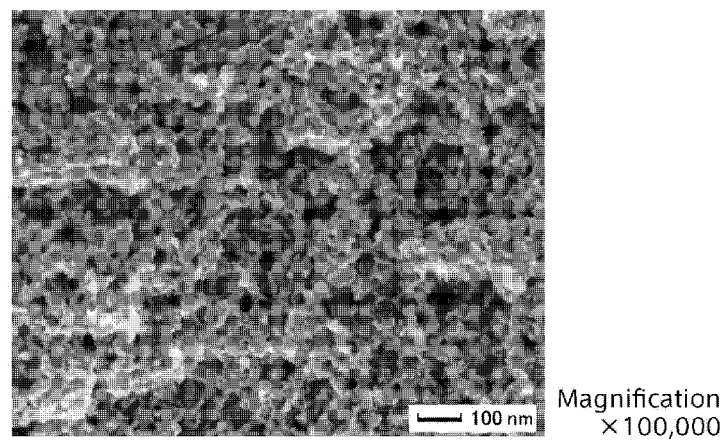

Further, an aqueous solution of nitric acid having a concentration of 3% was made ready to be at 40° C., in which the steel pieces were immersed for 3 minutes and after then rinsed with tap water. Next, the steel pieces were placed in a warm air drying machine set to be at 80° C. for 15 minutes for drying. After drying, the alloy pieces were collected together, wrapped with aluminum foil and then placed in a plastic bag, which was closed and stored. FIG. 6 shows an electron microscopic photograph (magnification of 10,000 times and 100,000 times) of the surface of the piece of stainless steel SUS304 subjected to the same treatment as the above. The sectional schematic view of FIG. 1(c) was depicted seeing this photograph. That is, the sectional schematic view of FIG. 1(c) was depicted on the basis of the photograph.

EXPERIMENT EXAMPLE 4

NAT Treatment of Common Steel (Referential Example)

Sheet stocks of cold rolled steel plate (SPCC) having a thickness of 3.2 mm were acquired and machined to form a plurality of small pieces with a dimension of 45 mm×18 mm×3.2 mm. Further, a plurality of small pieces with a dimension of 100 mm×25 mm×3.2 mm were formed by machining from the same steel sheet stocks. An aqueous solution containing degreaser "NE-6" (made by Meltex co. Ltd., main company in Tokyo, Japan) by 10% was made ready to be at 60° C. in a tank, in which the above steel pieces were immersed for 5 minutes, and after then the pieces were rinsed with tap water (Ota city, Gumma prefecture, Japan). Next, an aqueous solution of caustic soda having a concentration of 1.5% was made ready to be at 40° C. in another tank, in which the steel pieces were immersed for 1 minute and after then rinsed with tap water.

Figure 7:
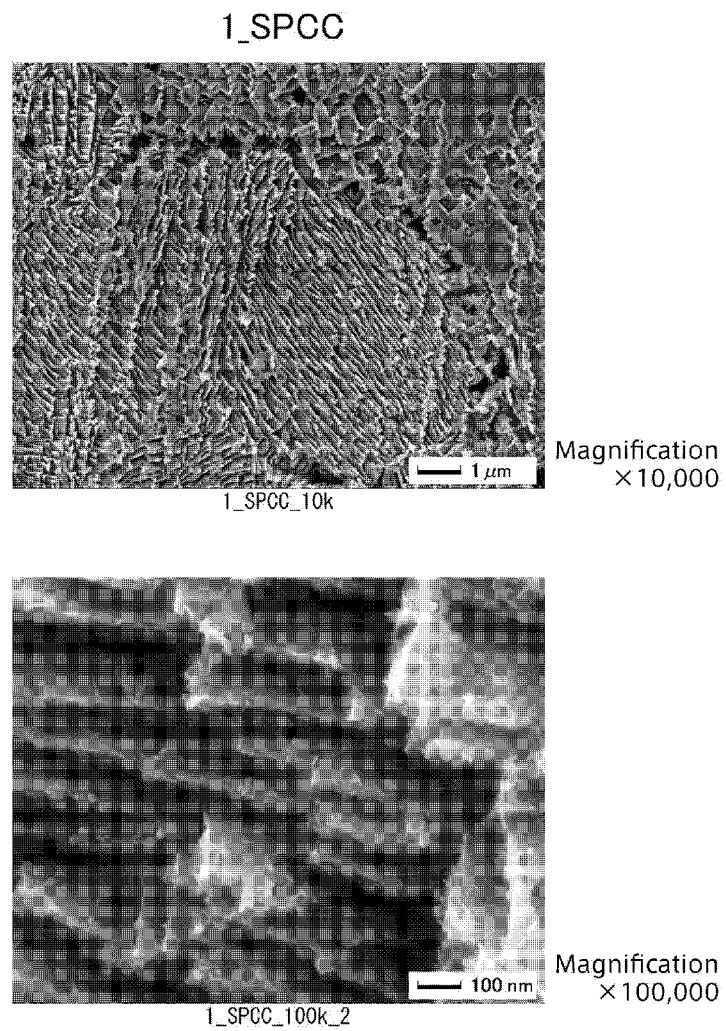
FIG. 7 is electron microscopic photographs of a ferrous material SPCC treated according to NAT with magnification of 10,000 times and 100,000 times respectively.

Further, an aqueous solution of sulfuric acid having a concentration of 5% was made ready to be at 60° C., in which the steel pieces were immersed for 4 minutes and after then rinsed with water. Next, an aqueous solution of ammonia having a concentration of 1% was made ready, in which the steel pieces were immersed for 1 minute and after then rinsed with water. Next, an aqueous solution containing 1.2%-chromium nitrate hydrate, 0.3%-chromium trioxide, 1.5%-phosphoric acid and 0.033%-basic nickel carbonate was made ready, in which the steel pieces were immersed for 1.5 minutes and after then rinsed with water. Next, the steel pieces were placed in a warm air drying machine set to be at 80° C. for 15 minutes for drying. After drying, the alloy pieces were collected together, wrapped with aluminum foil and then placed in a plastic bag, which was closed and stored. FIG. 7 shows an electron microscopic photograph (magnification of 10,000 times and 100,000 times) of the surface of the steel piece subjected to the same treatment as the above. The sectional schematic view of FIG. 1(d) was depicted seeing this photograph.

EXPERIMENT EXAMINATION 5

NAT Treatment of Pure Titanium (Referential Example)

Sheet stocks of a first species of pure titanium "KS-40" (made by Kobe-seikousho Co. Ltd., main company in Hyogo prefecture, Japan) having a thickness of 3 mm were acquired and machined to form a plurality of small pieces with a dimension of 45 mm×15 mm×3 mm. An aqueous solution containing aluminum degreaser "NE-6" (made by Meltex co. Ltd., main company in Tokyo, Japan) by 10% was made ready to be at 60° C. in a tank, in which the above titanium pieces were immersed for 5 minutes and after then the pieces were rinsed with tap water (Ota city, Gumma prefecture, Japan). Next, an aqueous solution of caustic soda having a concentration of 1.5% was made ready to be at 40° C. in another tank, in which the pieces were immersed for 1 minutes and after then the pieces were rinsed with water.

Figure 8:
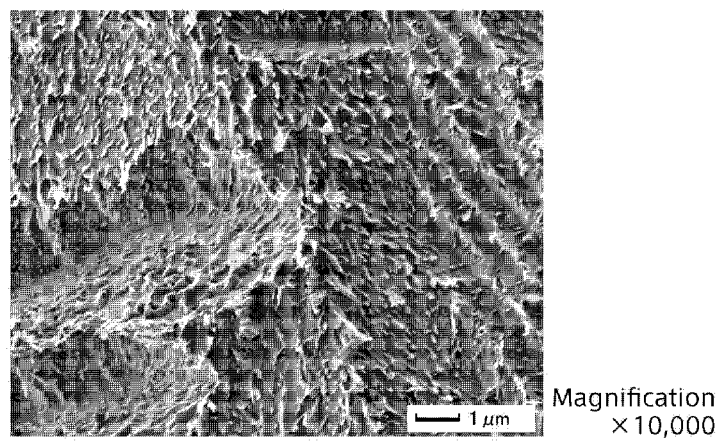
FIG. 8 is electron microscopic photographs of first species of pure titanium material "KS40" (made by Kobe-seikousho Co. Ltd. At Kobe. Hyogo Pref., Japan) treated according to NAT with magnification of 10,000 times and 100,000 times respectively.
Figure 8:
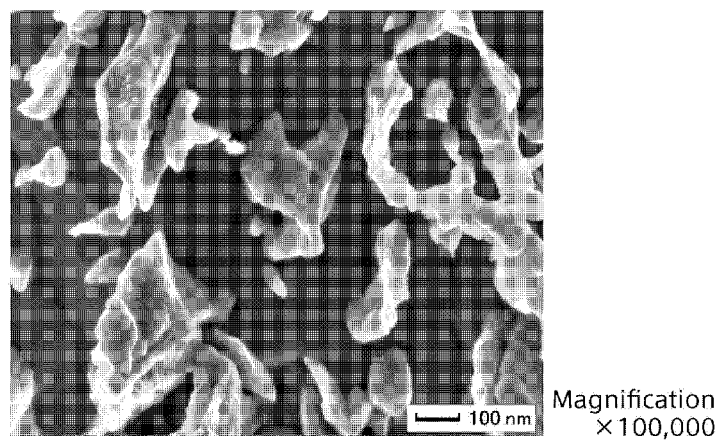

Further, an aqueous solution of an all-purpose etching agent "KA3" (made by Kinzokukakougijutsu-kenkyusho Co. Ltd., main company in Tokyo, Japan) having a concentration of 2% was made ready to be at 65° C., in which the above titanium pieces were immersed for 3 minutes and after then rinsed with water. Next, the pieces were placed in a warm air drying machine set to be at 80° C. for 15 minutes for drying. After drying, the titanium pieces were collected together, wrapped with aluminum foil and then placed in a plastic bag, which was closed and stored. FIG. 8 shows an electron microscopic photograph (magnification of 10,000 times and 100,000 times) of the surface of the piece of first species of pure titanium subjected to the same treatment as the above. The schematic view of FIG. 1(e) was depicted seeing this photograph.

EXPERIMENT EXAMINATION 6

New NAT Treatment of Pure Titanium, Titanium Alloy (Referential Example)

Sheet stocks of a second species of pure titanium "TP340" (made by Shinnitetsu-sumikin Co. Ltd., main company in Tokyo, Japan) having a thickness of 3 mm were acquired and machined to form a plurality of small pieces with a dimension of 45 mm×15 mm×3 mm. Further, a plurality of small pieces with a dimension of 100 mm×25 mm×3 mm were formed by machining from the same sheet stocks. An aqueous solution containing degreaser for aluminum "NE-6" (made by Meltex co. Ltd., main company in Tokyo, Japan) by 10% was made ready to be at 60° C. in a tank, in which the above titanium pieces were immersed for 5 minutes and after then the pieces were rinsed with tap water (Ota city, Gumma prefecture, Japan). Next, an aqueous solution of caustic soda having a concentration of 1.5% was made ready to be at 40° C. in another tank, in which the pieces were immersed for 1 minute and after then the pieces were rinsed with water. Next, an aqueous solution of an all-purpose etching agent "KA3" having a concentration of 2% was made ready to be at 65° C. in still another tank, in which the above titanium pieces were immersed for 3 minutes and after then rinsed with water. Next, the titanium pieces were immersed in an aqueous solution having a concentration of 3% and being at 40° C. for 3 minutes and after then rinsed with water. Next, the titanium pieces were immersed in an aqueous solution containing 5%-sodium chlorite and 10%-caustic soda and being at 55° C. for 10 minutes and after then rinsed with water. Next, the pieces were placed in a warm air drying machine set to be at 80° C. for 15 minutes for drying. After drying, the titanium pieces were collected together, wrapped with aluminum foil and then placed in a plastic bag, which was closed and stored.

FIG. 9 shows electron microscopic photographs of the surface of the piece of second species of pure titanium subjected to the same treatment as the above, in which FIG. 9-1 is in magnification of 1,000 times, FIG. 9-2 is in magnification of 10,000 times and FIG. 9-3 is in magnification of 100,000 times, respectively. One in 100,000 times is specifically remarkable, in which net-shaped configuration covers whole face and the period of convex-concave in the net-shape is observed to be 20 to 200 nm. While this is a configuration of irregular convex-concave pattern in net-shape in which the period of convex-concave in ultrafine irregularities is dispersed from small to large randomly, it approximates the sectional schematic view shown in FIG. 1(f) as a whole.

Figures 1, 10:
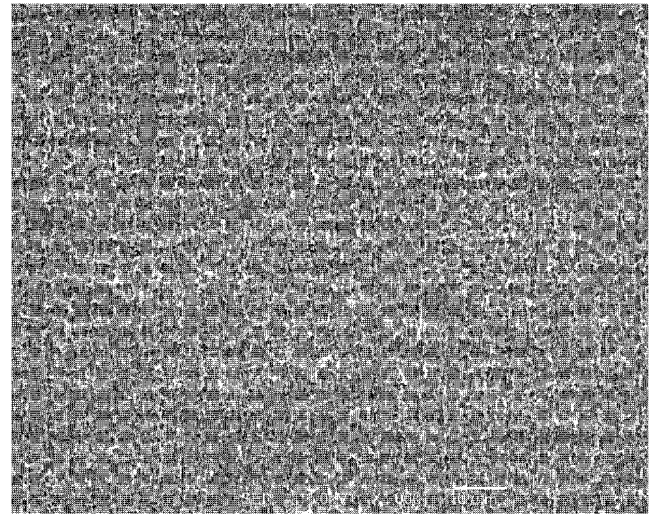
Figures 2, 10:
Figures 3, 10:
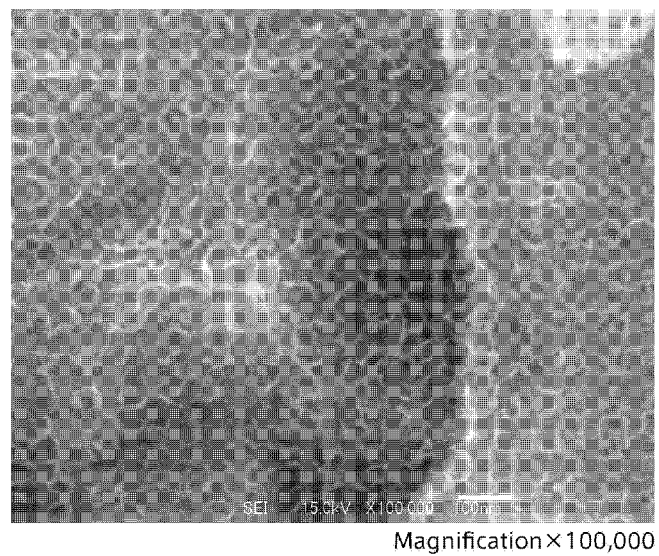

While it is not clear why the above configuration of ultrafine net-shaped convex-concave is formed, a probe was made as to whether similar configuration can be formed or not for titanium alloys having higher hardness than a pure titanium. As a result, titanium alloys having such configuration of ultrafine net-shaped convex-concave were obtained by performing oxidization treatment of α-β titanium alloy "KSTI-9" (made by Kobe-seikousho Co. Ltd., main company in Hyogo prefecture, Japan) and α-β titanium alloy "KS6-4" (made by Kobe-seikousho Co. Ltd., main company in Hyogo prefecture, Japan). FIG. 10-1 to FIG. 10-3 and FIG. 11-1 to FIG. 11-3 are electron microscopic photographs of such surface configuration. The configuration in FIG. 10-2 is analogous to one in FIG. 1(g) and the configuration in FIG. 11-1 is analogous to one in FIG. 1(i).

EXPERIMENT EXAMINATION 7

NAT Treatment of Copper

Sheet stocks of copper CC1100 having a thickness of 3 mm were acquired and machined to form a plurality of small pieces with a dimension of 45 mm×15 mm×3 mm. Further, a plurality of small pieces with a dimension of 100 mm×25 mm×3 mm were formed by machining from the same copper sheet stocks. An aqueous solution containing degreaser "NE-6" by 10% was made ready to be at 60° C. in a tank, in which the above copper pieces were immersed for 5 minutes and after then the pieces were rinsed with tap water (Ota city, Gumma prefecture, Japan). Next, an aqueous solution of caustic soda having a concentration of 1.5% was made ready to be at 40° C. in another tank, in which the copper pieces were immersed for 1 minute and after then rinsed with water. Next, an aqueous solution of nitric acid having a concentration of 10% was made ready to be at 40° C. in still another tank, in which the copper pieces were immersed for 0.5 minute. Next, an aqueous solution of nitric acid having a concentration of 3% was made ready to be at 40° C., in which the copper pieces were immersed for 10 minutes and after then rinsed with water.

Further, an aqueous solution containing potassium permanganate by 2% and caustic potassium by 3% was made ready to be at 70° C., in which the copper pieces was immersed for 35 minutes and after then rinsed with water. Next, the copper pieces were immersed in an aqueous solution containing sodium chlorite by 5% and caustic soda by 10% and being at 55° C. for 10 minutes and after then rinsed with water. Next, the copper pieces were placed in a warm air drying machine set to be at 80° C. for 15 minutes for drying. After drying, the copper pieces were collected together, wrapped with aluminum foil and then placed in a plastic bag, which was closed and stored.

FIG. 12 shows electron microscopic photographs of the surface of the copper C1100 piece subjected to the same treatment as the above, in which FIG. 12-1 is in magnification of 10,000 times and FIG. 12-2 is in 100,000 times. As seen in FIG. 12-2 (photograph in 100,000 times), the whole face is covered with surface configuration of ultrafine irregularities in which rectangular parallelepiped pieces with a side dimension of 10 to 200 nm stand on a plain in number density of 10 to 20 in a square of 200 nm×200 nm. In short, this approximates the visage in FIG. 1(j).

EXPERIMENT EXAMINATION 8

New NAT Treatment of Copper (Referential Example)

Sheet stocks of copper CC1100 having a thickness of 3 mm were acquired and machined to form a plurality of small pieces with a dimension of 45 mm×15 mm×3 mm. Further, a plurality of small pieces with a dimension of 100 mm×25 mm×3 mm were formed by machining from the same copper sheet stocks. An aqueous solution containing degreaser "NE-6" by 10% was made ready to be at 60° C. in a tank, in which the above copper pieces were immersed for 5 minutes and after then the pieces were rinsed with tap water (Ota city, Gumma prefecture, Japan). Next, an aqueous solution of caustic soda having a concentration of 1.5% was made ready to be at 40° C. in another tank, in which the copper pieces were immersed for 1 minute and after then rinsed with water. Next, an aqueous solution of nitric acid having a concentration of 10% was made ready to be at 40° C. in still another tank, in which the copper pieces were immersed for 0.5 minute. Next, an aqueous solution of nitric acid having a concentration of 3% was made ready to be at 40° C., in which the copper pieces were immersed for 10 minutes and after then rinsed with water.

Further, an aqueous solution containing 10%-sulfuric acid and 4%-hydrogen peroxide was made ready to be at 25° C. in still another tank, in which the copper pieces were immersed for 3 minutes and after then rinsed with water. Next, an aqueous solution containing potassium permanganate by 2% and caustic potassium by 3% was made ready to be at 70° C., in which the copper pieces was immersed for 35 minutes and after then rinsed with water. Next, the copper pieces were immersed in an aqueous solution containing sodium chlorite by 5% and caustic soda by 10% and being at 55° C. for 10 minutes and after then rinsed with water. Next, the copper pieces were placed in a warm air drying machine set to be at 80° C. for 15 minutes for drying. After drying, the copper pieces were collected together, wrapped with aluminum foil and then placed in a plastic bag, which was closed and stored.

FIG. 13 shows electron microscopic photographs of the surface of the copper C1100 piece subjected to the same treatment as the above, in which FIG. 13-1 is in magnification of 1,000 times, FIG. 13-2 is in 10,000 times and FIG. 13-3 is in 100,000 times. As seen in FIG. 13-3 (photograph in 100,000 times), the surface configuration is such that whiskers grow like hairs on head densely, the whiskers are long and the base ground is not seen, while the whiskers seem to cross and be entangled among them. It is a question whether adhesive can sufficiently penetrate into the root of the whiskers. The inventor considers of making the whiskers have a length below one half to be of erect shortened hair type. The configuration in FIG. 1(k) is a schematic view showing the shortened hair type when it is accomplished.

EXPERIMENT EXAMPLE 9

NAT Treatment of Mg-Alloy

Sheet stocks of magnesium alloy AZ31B having a thickness of 1 mm were acquired and machined to form a plurality of small pieces with a dimension of 45 mm×15 mm×1 mm. An aqueous solution containing degreaser for magnesium alloy "Cleaner160" (Meltex Co. Ltd. main company in Tokyo, Japan) by 10% was made ready to be at 60° C. in a tank, in which the above magnesium alloy pieces were immersed for 5 minutes and after then the alloy pieces were rinsed with tap water (Ota city, Gumma prefecture, Japan). Next, an aqueous solution of citric acid hydrate having a concentration of 1% was made ready to be at 40° C. in another tank, in which the alloy pieces were immersed for 4 minutes and after then rinsed with water. Next, an aqueous solution containing sodium carbonate by 1% and sodium bicarbonate by 1% was made ready to be at 65° C. in still another tank, in which the alloy pieces were immersed for 5 minutes. Next, an aqueous solution of caustic soda having a concentration of 15% was made ready to be at 65° C. in still another tank, in which the alloy pieces were immersed for 5 minutes and after then rinsed with water.

Further, an aqueous solution of citric acid hydrate having a concentration of 0.25% was made ready to be at 40° C. in another tank, in which the alloy pieces were immersed for 1 minute and after then rinsed with water. Next, the rinsed alloy pieces were immersed in an aqueous solution containing 2%-potassium permanganate, 1%-acetic acid and 0.5%-sodium acetic acid hydrate and being at 45° C. for 1 minute and after then rinsed with water. Next, the alloy pieces were placed in a warm air drying machine set to be at 80° C. for 15 minutes for drying. After drying, the alloy pieces were collected together, wrapped with aluminum foil and then placed in a plastic bag, which was closed and stored. FIG. 14 shows electron microscopic photographs of the surface of the magnesium alloy AZ31B piece subjected to the same treatment as the above in magnification of 100,000 times. FIG. 1(*l*) was depicted seeing FIG. 14.

EXPERIMENT EXAMINATION 10

Preparation of Pieces Formed by NAT Adhesion and Measurement of Shear Strength

Using paired pieces for forming test pieces of the metal or metal alloys obtained with Examination Examples 1 to 9: of Al-alloy A7075, stainless steel SUS304, cold rolled steel plate SPCC, first species of pure titanium "KS-40", α-β Ti-alloy "KSTI-9", α-β Ti-alloy "KS6-4", copper C1100 and magnesium alloy AZ31B, test pieces shown in FIG. 2 were prepared by adhesion of the paired pieces according to NAT with a one-part epoxy adhesive.

That is, about 2 g of MIBK (methylisobuthylketone) was added to 3 g of the above described adhesive and stirred sufficiently, thus obtaining a suspension. Then, one end portion with about 4 mm width of each metal small piece with a dimension of 45 mm×15 mm×(3 to 3.5) mm having been subjected to surface treatment was painted sufficiently with the above obtained suspension using the tip of a stick. The metal small pieces were placed in a hot air drying machine set to be at 55° C. for 20 minutes, causing MIBK to be volatilized. The metal small pieces were then taken out and painted additionally with the previous adhesive (same as the above). After then, the ends of the metal small pieces painted with adhesive were joined to form a paired piece (test piece). Each of thus formed paired pieces was fixed with two clips. The paired pieces in the fixed state were placed in a hot air drying machine set to be at 135° C., then after temperature was raised to 170° C. the pieces were kept there for 15 minutes to heat them and after then taken out of the drying machine.

The test pieces were kept in a state where the clips were taken off. On the next day, the test pieces were subjected to tensile breaking test to measure shear breaking strength of adhesion of these test pieces. Here, as Mg-alloy pieces had thickness of 1 mm, 3 pieces of these painted with adhesive were layered to form a piece, thus 6 Mg-alloy small pieces resulted in forming one test piece for measurement. Then, 5 test pieces, each of which was joined by adhesion, were prepared for each species of metal or metal alloy and broken in test to record mean shear strength of adhesion. The result of test is shown in the following Table 1. As can be said from Table 1, while the shear strength of adhesion of a first species of pure titanium is somewhat low, the tensile strength of adhesion of other metals or metal alloys is sufficiently high. When the broken face was actually observed, such site could not be seen where metal portion is exposed on the broken faces of both sides. Thus, it was found that excellent adhesion was made.

TABLE 1

Shear Strength of Adhesion of Various Metals or Metal Alloys Joined with One-part Epoxy Adhesive

| Metal Species | Metal Treatment | Photograph | Classification by FIG. 1 | Shear Strength of Adhesion |
|---|---|---|---|---|
| Al-alloy A7075 | NAT | FIG. 4 | (b) | 79 MPa |
| Al-alloy A7075 | New NAT | FIG. 5 | (b) | 81 MPa |
| Stainless Steel SUS304 | NAT | FIG. 6 | (c) | 73 MPa |
| Cold rolled Steel Plate (SPCC) | NAT | FIG. 7 | (d) | 73 MPa |
| 1st Species of Pure Titanium | NAT | FIG. 8 | (e) | 65 MPa |
| 2nd Species of Pure Titanium | New NAT | FIG. 9 | (f) | 78 MPa |
| α-β Ti-alloy KSTI-9 | New NAT | FIG. 10 | (h) | 80 MPa |
| α-β Ti-alloy KS6-4 | New NAT | FIG. 11 | (i) | 80 MPa |
| Copper C1100 | New NAT | FIG. 12 | (j) | 79 MPa |
| Copper C1100 | New NAT | FIG. 13 | (k) | 80 MPa |
| Magnesium Alloy AZ31B | NAT | FIG. 14 | (l) | 81 MPa |

EXPERIMENT EXAMPLE 11

Preparation of Pieces Formed by NAT Adhesion and Measurement of Tensile Strength of Adhesion Using paired pieces for forming test pieces of the metal or metal alloys obtained with Examination Examples 1 to 5: of Al-alloy A7075, stainless steel SUS304, cold rolled steel plate SPCC, first species of pure titanium "KS-40", second species of pure titanium "TP340", α-β Ti-alloy "KSTI-9" and α-β Ti-alloy "KS6-4", test pieces shown in FIG. 3 were prepared by adhesion of the paired pieces according to NAT with a one-part epoxy adhesive "Scotch Weld EW2040" (made by Three M Japan Co. Ltd.: Main company in Tokyo, Japan).

That is, about 2 g of MIBK was added to 3 g of the above described adhesive and stirred sufficiently, thus obtaining a suspension. Then, one edge face (face of 25 mm×3 mm) of each metal small piece with a dimension of 100 mm×25 mm×3 mm having been subjected to surface treatment was painted sufficiently with the above obtained suspension using the tip of a stick. The metal small pieces were placed in a hot air drying machine set to be at 55° C. for 20 minutes, causing MIBK to be volatilized. The metal small pieces were then taken out and painted additionally with the adhesive. After then, the end faces of paired metal small pieces painted with adhesive were caused to abut on each other and form a pair. Winding TEFRON seal tape around the joined portion of the pair, fixing the portion with two clips and pushing the pair at the both ends, the thickness of the adhesive was approximated to zero. After then, the adhesive were cured in the hot air drying machine in a similar manner as in Experiment Examination 6.

The test pieces were taken out of the drying machine and clips were taken off. On the next day, peeling off the TEFRON seal tape, the cured adhesive protruding out of the joined face was ground away so that the area of adhesion is of (below 25 mm)×(below 3 mm), that is, 0.7 to 0.73 cm². The test pieces were broken in tensile strength test to measure tensile strength of adhesion. The following Table 2 shows the result of the test in which the highest tensile strength of the data obtained with 5 pairs of test pieces for each metal species by breaking these in test is recorded.

TABLE 2

Tensile Strength of Adhesion of Various Metals or Metal Alloys joined with One-Part Epoxy Adhesive

| Metal Species | Metal Treatment | Photograph | Classification by FIG. 1 | Tensile Strength of Adhesion |
|---|---|---|---|---|
| Al-alloy A7075 | NAT | FIG. 4 | (b) | 81 MPa |
| Al-alloy A7075 | New NAT | FIG. 5 | (b) | 103 MPa |
| Stainless Steel SUS304 | NAT | FIG. 6 | (c) | 59 MPa |
| Cold rolled Steel Plate (SPCC) | NAT | FIG. 7 | (d) | 67 MPa |
| 1st Species of Pure Titanium | NAT | FIG. 8 | (e) | 601 MPa |
| 2nd Species of Pure Titanium | New NAT | FIG. 9 | (f) | 85 MPa |
| α-β Ti-alloy KSTI-9 | New NAT | FIG. 10 | (h) | 97 MPa |
| α-β Ti-alloy KS6-4 | New NAT | FIG. 11 | (i) | 98 MPa |
| Copper C1100 | New NAT | FIG. 12 | (j) | 80 MPa |
| Copper C1100 | New NAT | FIG. 13 | (k) | 62 MPa |

As can be said from Table 2, the tensile strength of test pieces shown in FIGS. 5, 10 and 11 was about 100 MPa and the highest value was 103.2 MPa that Al-alloy shown in FIG. 5 exhibited. The test piece that exhibited high tensile strength of adhesion next to this was one shown in FIG. 9, and further test pieces shown in FIGS. 4 and 12 exhibited approximately 80 MPa. In these, the tensile strength was same as or higher than the shear strength.

Here, FIGS. 20 and 21 show photographs of the test pieces formed by joining paired small pieces of Al-alloy A7075 that exhibited tensile strength of adhesion of 103.2 MPa as above. While FIG. 20 shows the situation in which fragmentary pieces of the test piece broken in test are arranged side by side as before breaking, FIG. 21 shows a close-up photograph of a trace of the adhesion face. While the thickness of adhesive layer was taken as 0.17 mm as determined from the measurement data of the length of the test piece before breaking in test, the test piece was split into two fragments near the center of the adhesive layer and metal face could not be seen in the trace of adhesion face by observation with a magnifier. Consequently, it was presumed that the strength of adhesion is of a value same as or near to the tensile strength of the cured adhesive "EW2040".

The tensile strength of Al-alloy A7075 clearly increased by changing from NAT treatment to New NAT treatment. While new strange linear shapes appear in electron microscopic photographs with transition from FIG. 4 to FIG. 5, the inventor did not consider that the linear shapes brought an effect, but presumed they were brought because the configuration of ultrafine bowl-shaped concaves was neatened by shortening the time of immersion in hydrazine hydrate to a half. Although SPCC has high strength among those below 80 MPa, it is clearly different from the above four species. Stainless steel SUS304 and the first species of pure titanium by NAT treatment have low strength. The high-low of strength is as supposed in FIG. 1 and can be understood seeing electron microscopic photographs.

EXPERIMENT EXAMINATION 12

Composite of a Metal Piece and a CFRP Piece Formed by NAT Adhesion and Shear Strength of Adhesion Using metal pieces obtained with Examination Examples 2 to 6: of Al-alloy A7075, stainless steel SUS304, cold rolled steel plate SPCC, α-β Ti-alloy "KSTI-9", α-β Ti-alloy "KS6-4", and two kinds of CFRP pieces for each metal piece, test pieces shown in FIG. 2 were prepared by adhesion of the paired metal piece and CFRP piece according to NAT with a one-part epoxy adhesive "Scotch Weld EW2040".

That is, about 2 g of MIBK was added to 1 g of the above described adhesive and stirred sufficiently, thus obtaining a suspension. Then, one end portion with about 4 mm width of each metal small piece with a dimension of 45 mm×15 mm×3 mm having been subjected to surface treatment was painted sufficiently with the above obtained suspension using the tip of a stick. On the other hand, regarding also CFRP pieces (FIG. 13) with a dimension of 45 mm×15 mm×3 mm similar to the above that is formed in such a type of fiber bundles arranged in two longitudinal directions, one end portion with about 4 mm of each small piece was ground sufficiently with a sandpaper of #600 to a state where a part of CF is exposed. Then, the small pieces were immersed in a degreaser bath with a supersonic wave devise for several minutes and rinsed with water, after which they were dried at 80° C. with hot air for 15 minutes.

Then, the end portion of each CFRP piece were painted sufficiently with a solvent containing adhesive with the tip of a stick in a similar manner as metal small pieces. The CFRP pieces were placed in a warm air drying machine set to be at 55° C. for 20 minutes with MIBK volatilized, then taken out and painted additionally with the adhesive. After then, the end portion of each of the CFRP pieces and the end portion of metal small pieces painted with adhesive were joined to form a paired piece (test piece). Each of thus formed paired pieces was fixed with two clips. The paired pieces in the fixed state were placed in a hot air drying machine set to be at 135° C., then the temperature was raised to 170° C. and the paired pieces were kept there for 15 minutes and taken out after then. The shear strength of adhesion of the test pieces obtained through the operation were measured and the average shear strength of adhesion of 5 paired pieces is shown in Table 3. It was clear that the strength in result is almost decided depending on the CF contained in CFRP. As regards the face of breaking, breaking did not occur at the interface between the metal part and the CFRP part, but the surface layer of the CFRP was broken. A certain amount of carbon fiber had adhered to the trace of broken face on the side of the metal part. In short, the strength of adhesion was exhibited as a result such that the strength of adhesion between CF within the CFRP and the matrix resin appeared itself.

TABLE 3

Strength of Adhesion of CFRP with Various Metals or Metal Alloys: Shear Strength of Adhesion

| Metal Species | Metal Treatment | Photograph | Classification by FIG. 1 | Shear Strength of Adhesion |
|---|---|---|---|---|
| CFRTP (CF of 6 Gpa is used) | | | | |
| Al-Alloy A7075 | New NAT | FIG. 5 | (b) | 41 MPa |
| Stainless Steel SUS304 | NAT | FIG. 6 | (c) | 40 MPa |
| Cold Rolled Steel Plate (SPCC) | NAT | FIG. 7 | (d) | 41 MPa |
| α-β Ti-alloy KSTI-9 | New NAT | FIG. 10 | (h) | 43 MPa |
| α-β Ti-alloy KS6-4 | New NAT | FIG. 11 | (i) | 40 Mpa |
| CFRTP (CF of 3.5 Gpa is used) | | | | |
| Al-Alloy A7075 | New NAT | FIG. 5 | (b) | 59 MPa |
| Stainless Steel SUS304 | NAT | FIG. 6 | (c) | 58 MPa |
| Cold Rolled Steel Sheet (SPCC) | NAT | FIG. 7 | (d) | 57 MPa |
| α-β Ti-alloy KSTI-9 | New NAT | FIG. 10 | (h) | 59 MPa |
| α-β Ti-alloy KS6-4 | New NAT | FIG. 11 | (i) | 59 MPa |

EXPERIMENT EXAMPLE 13

Composite of a Metal Piece and a CFRP Piece Formed by NAT Adhesion and Shear Strength of Adhesion Regarding two kinds of CFRP pieces (FIG. 15) acquired from Toray co. Ltd. and sized to be 45 mm×15 mm×3 mm, it was tried to measure two kinds of tensile strength of adhesion of the test pieces each of which was formed by adhesion of the CFRP piece and a metal small piece. The reason for this is that the CFRP pieces were of a longitudinal fiber bundle type. Specifically, the shape of the metal piece was changed in order to prevent the CFRP piece from being damaged by impact to create flaw, thus test pieces of paired pieces as shown in FIGS. 16 and 17 were prepared. That is, pieces of Al-alloy A7075, stainless steel SUS304 and α-β Ti-alloy "KS6-4" with a dimension of 45 mm×15 mm×3 mm were prepared and these metal pieces were subjected to NAT treatment or New NAT treatment. The end face or side face of each of these metal pieces was used for a face of adhesion. Also regarding each CFRP piece, the face for adhesion was treated with a sandpaper of #600, cleaned under supersonic waves and subjected to roughening treatment in a similar manner as the above Experiment Examination. After then, each metal piece and CFRP piece were bonded by adhesion using a one-part epoxy adhesive "EW2040" according to NAT including treatment of "impregnation".

After articles formed by adhesion shown in FIGS. 16 and 17 were obtained, these were broken in test with a tensile tester and the tensile strength of adhesion was measured. The result was shown in Tables 4 and 5. Having observed the face of breaking in all the test pieces shown in Tables 4 and 5, adhering resin portion was seen in all the area of the trace of adhesion on the side of the metal part and scrapped CF was not seen there at all. Further, any tip of peeled CF portion was not be seen there. In short, it was clarified to be material breaking in both materials (cured matrix resin and cured adhesive).

TABLE 4

Strength of Adhesion of CFRP with Metals or Metal Alloys: Tensile Strength of Adhesion in the Same Direction as CF

| Metal Species | Metal Treatment | Photograph | Classification by FIG. 1 | Tensile Strength of Adhesion |
|---|---|---|---|---|
| CFRTP (CF of 6 Gpa is used) | | | | |
| Al-Alloy A7075 | New NAT | FIG. 5 | (b) | 58 MPa |
| Stainless Steel SUS304 | NAT | FIG. 6 | (c) | 56 MPa |
| α-β Ti-alloy KS6-4 | New NAT | FIG. 11 | (i) | 58 MPa |

TABLE 5

Strength of Adhesion of CFRP with Metals or Metal Alloys: Tensile Strength of Adhesion in the Direction perpendicular to CF

| Metal Species | Metal Treatment | Photograph | Classification by FIG. 1 | Tensile Strength of Adhesion |
|---|---|---|---|---|
| CFRTP (CF of 6 Gpa is used) | | | | |
| Al-Alloy A7075 | New NAT | FIG. 5 | (b) | 57 MPa |
| Stainless Steel SUS304 | NAT | FIG. 6 | (c) | 57 MPa |
| α-β Ti-alloy KSG-4 | New NAT | FIG. 11 | (i) | 58 MPa |

CFRP pieces having been made using a new type of CF with high strength was used. It is known that the strength of adhesion between CF and matrix resin within the CFRP is at most about 40 MPa. Although CFRP is such, the tensile strength of the composite formed by bonding the CFRP piece and a metal piece by adhesion exhibited approximately 60 MPa. Further, such a result was obtained that the strength is not related to the direction of fiber arrangement. Compared with these data of tensile strength of adhesion, the data of shear strength of adhesion shown in FIG. 3 shows a result quite different from ones of tensile strength of adhesion.

It is obvious that the difference is caused by the laminated structure of prepreg. While prepreg sheets are formed usually containing CF bundled longitudinally, the direction of fiber arrangement is parallel with sheet surface and matrix resin fills the gap space connecting upper and lower surfaces of fiber bundle. If the strength of adhesion between the CF and the matrix resin is about 40 MPa, it is natural that the shear breaking occurs at the face of parallel fiber bundles at the moment of shear breaking. In short, in the case where surface treatment of metal part is brought to an ideal level as shown by the present disclosure, it can be understood that what can be done first with a CFRP as the adherend part is to vary the direction of prepreg arrangement.

What is claimed is:

1. A method for producing a metal containing composite, comprising:
   a step of preparing an adhesive (B) containing solvent and formed as a suspension of low viscosity by adding a ketone solvent to a one-part epoxy adhesive (A) using dicyandiamide as a curing agent and mixing the same;
   a step of preparing one kind of metal shaped article as an adherend selected from the following five kinds of metal shaped articles (M1 to M5):
   a metal shaped article (M1), which, through surface treatment including chemical etching and/or surface hardening, has a surface with ultrafine irregularities covered entirely with substantially ultrafine bowl-shaped concaves of 20 to 100 nm diameter and in which said surface with said ultrafine irregularities is covered with a thin layer of ceramics comprising a metal oxide or a metal phosphate, a metal shaped article (M2), which, through surface treatment including chemical etching and/or surface hardening, has a roughened surface, in which a forest of convexes shaped like thick walls or convexes of indefinite shapes as formed by collapse of such thick walls with short dimension and long dimension of 0.05 to 1 μm and height of more than 0.3 μm stand with space of 0.1 to 2 μm therebetween, the roughened surface being entirely covered with ultrafine irregularities having period of 20 to 100 nm and the whole surface being covered with a thin layer of ceramics comprising a metal oxide or a metal phosphate, a metal shaped article (M3), which, through surface treatment including chemical etching and/or surface hardening, has a roughened surface having bowl-like concave faces of 1 to 5 μm period, the roughened surface being entirely covered with ultrafine irregularities having period of 20 to 100 nm and the whole surface being covered with a thin layer of ceramics comprising a metal oxide or a metal phosphate, a metal shaped article (M4), which, through surface treatment including chemical etching and/or surface hardening, has a surface with ultrafine irregularities covered entirely with cubic protrusions in a dimension of 10 to 200 nm or mixed protrusions of such cubic protrusions and disc-shaped protrusions of 100 to 250 nm diameter standing on a plain in a density of 5 to 50 per square of 200 nm side, the whole surface being covered with a thin layer of ceramics comprising a metal oxide or a metal phosphate, and a metal shaped article (M5), which, through surface treatment including chemical etching and/or surface hardening, has a surface configuration loaded with spherical entities of about 100 run diameter combined among themselves along with a configuration of numerous short whiskers below 10 nm growing on the surface of the spherical entities, the whole surface being covered with a thin layer of ceramics comprising a metal oxide or a metal phosphate;

a step of painting a face for adhesion of said selected metal shaped article (M1 to M5) with said adhesive (B) containing solvent and volatilizing the ketone solvent in a drying machine or through air-drying;

a step of preparing a resin shaped article (P1) as another adherend by curing a thermosetting epoxy resin composition comprising an epoxy resin as a main constituent;

a step of forming a roughened face for adhesion of the resin shaped article (P1) with several decades μm order on a specified portion of said resin shaped article (P1) by grinding it with physical means, cleaning with water, drying and removing dirt;

a step of painting the roughened face for adhesion of said resin shaped article (P1) with said adhesive (B) containing solvent and volatilizing the ketone solvent in a drying machine or through air-drying; and a step of causing the face for adhesion of said selected metal shaped article (M1 to M5) and the roughened face of adhesion of said resin shaped article (P1), both of which were painted with the one-part epoxy adhesive to abut on each other and fixing the metal shaped article and the resin shaped article, heating the fixed shaped articles at a temperature of 150 to 180° C. and curing the one-part adhesive to accomplish adhesion, wherein the tensile strength of adhesion between the metal shaped article and the resin shaped article is equal to or higher than the shear strength of adhesion.

2. A method for producing a metal containing composite according to claim 1, wherein said ketone solvent is methyl-isobutyl-ketone.

* * * * *